(12) United States Patent
Kudou

(10) Patent No.: US 7,573,785 B2
(45) Date of Patent: Aug. 11, 2009

(54) METHOD AND APPARATUS FOR RECORDING AUDIO TRACKS INTO LARGE STORAGE DEVICE

(75) Inventor: Shigetaka Kudou, Tokyo (JP)

(73) Assignee: Sony Corporation (JP)

( * ) Notice: Subject to any disclaimer, the term of this patent is extended or adjusted under 35 U.S.C. 154(b) by 778 days.

(21) Appl. No.: 10/509,838

(22) PCT Filed: Apr. 14, 2003

(86) PCT No.: PCT/JP03/04707

§ 371 (c)(1),
(2), (4) Date: Sep. 30, 2004

(87) PCT Pub. No.: WO03/088249

PCT Pub. Date: Oct. 23, 2003

(65) Prior Publication Data

US 2005/0185927 A1    Aug. 25, 2005

(30) Foreign Application Priority Data

Apr. 15, 2002   (JP)   .............................. 2002-112367

(51) Int. Cl.
G11B 21/08    (2006.01)
(52) U.S. Cl. .............. 369/30.05; 369/30.19; 369/47.12; 707/104.1
(58) Field of Classification Search ............... 369/30.05, 369/30.19, 83, 84, 7; 707/104.1
See application file for complete search history.

(56) References Cited

U.S. PATENT DOCUMENTS

| | | | |
|---|---|---|---|
| 6,172,948 B1 * | 1/2001 | Keller et al. | 369/83 |
| 6,449,226 B1 * | 9/2002 | Kumagai | 369/47.1 |
| 6,487,145 B1 * | 11/2002 | Berhan | 369/30.15 |
| 6,587,404 B1 * | 7/2003 | Keller et al. | 369/30.06 |
| 6,898,159 B2 * | 5/2005 | Kudo | 369/30.05 |
| 7,126,770 B1 * | 10/2006 | Arai et al. | 360/8 |
| 7,145,839 B2 * | 12/2006 | Iijima et al. | 369/30.19 |
| 7,187,627 B2 * | 3/2007 | Nonaka et al. | 369/30.05 |
| 7,190,646 B1 * | 3/2007 | Yamauchi | 369/47.12 |

FOREIGN PATENT DOCUMENTS

| | | |
|---|---|---|
| EP | 0 962 929 | 12/1999 |
| JP | 2-208888 A | 8/1990 |

(Continued)

*Primary Examiner*—Tan X Dinh
(74) *Attorney, Agent, or Firm*—Lerner, David, Littenberg, Krumholz & Mentlik, LLP

(57) ABSTRACT

A recording and reproducing apparatus includes: a reproducing element for reproducing main data and TOC data for managing the main data that are recorded in a CD; a recording and reproducing element for recording in and reproducing from an HDD the main data reproduced from the CD 1 and a playback list for managing the main data; an end detection element for detecting an end of each track of the main data; a complete reproducing detection element for detecting that a track has been reproduced completely; a renewal element for renewing the playback list to be recorded in the HDD based on detecting results from the end detection element and the complete reproducing detection element; and a generating element for controlling recording the main data in the HDD based on the playback list and controlling the renewal element so as to renew the playback list when the main data is recorded in the HDD.

18 Claims, 26 Drawing Sheets

FOREIGN PATENT DOCUMENTS

| | | |
|---|---|---|
| JP | 09-311799 A | 12/1997 |
| JP | 11-126367 A | 5/1999 |
| JP | 2000-224523 A | 8/2000 |
| JP | 2001-076464 A | 3/2001 |
| JP | 2001-110171 A | 4/2001 |
| JP | 2001-189048 A | 7/2001 |
| JP | 2002-063761 A | 2/2002 |

* cited by examiner

FIG. 10

| | BLKID-TL0 | | | T-ALB | | REVISION | | |
|---|---|---|---|---|---|---|---|---|
| 0x0000 | | | | | | | | |
| 0x0010 | | | | | | | | |
| 0x0020 | | | | | | | | |
| 0x0120 | | | | | | | | |
| 0x0320 | | | | | | | | |
| 0x0330 | | | | | | | | |
| 0x0350 | Alb-001 | Alb-002 | Alb-003 | Alb-004 | Alb-005 | Alb-006 | Alb-007 | Alb-008 |
| 0x0360 | Alb-009 | Alb-010 | Alb-011 | Alb-012 | Alb-013 | Alb-014 | Alb-015 | Alb-016 |
| | | | | Alb-500 | 0 | 0 | | |
| 0x0740 | Alb-505 | Alb-506 | Alb-507 | Alb-508 | Alb-509 | Alb-510 | | |
| 0x3ff0 | BLKID-TL0 | | | | | REVISION | | |

FIG. 11

| | 112-1 | 111-1 112-2 | 112-3 | 111-2 112-4 | 111-3 | | | |
|---|---|---|---|---|---|---|---|---|
| 0x0000 | BLKID-TL0 | Reserved | | Mcode | REVISION | | | |
| 0x0020 | SN1C+L | SN2C+L | SINFSIZE | T-TRK | Reserved | Reserved | | |
| 0x0020 | NM1-S(256) | | | | | | | |
| 0x0120 | NM2-S(512) | | | | | | | |
| | | | | | | | | S-YMDhms ⟵ 117 |
| 0x0350 | | TRK-001 | TRK-002 | TRK-003 | TRK-004 | TRK-005 | TRK-006 | TRK-007 | TRK-008 |
| 0x0360 | TRK-009 | TRK-010 | TRK-011 | TRK-012 | TRK-013 | TRK-014 | TRK-015 | TRK-016 |
| | | | | | | | | |
| 0x0660 | TRK-393 | TRK-394 | TRK-395 | TRK-396 | TRK-397 | TRK-398 | TRK-399 | TRK-400 |
| 0x0670 | INF-S(14720) ⟵ 116 | | | | | | | |
| 0x3ff0 | BLKID-TL0 | Reserved | | Mcode | REVISION | Reserved | | |

113 — 114 — 115 File Number

FIG. 13

| | | | | | |
|---|---|---|---|---|---|
| ANMO | | 1 | | | |
| 1 | 0x0209 | ALBUM_NAME1 | 0x0209 | ARTIST1 | |
| 2 | 0x0000 | 0 | 0x0000 | 0 | |
| | | | | | |
| 61 | 0x0209 | ALBUM_NAME61 | 0x0209 | ARTIST61 | |
| 62 | 0x0209 | ALBUM_NAME62 | 0x0209 | ARTIST62 | |
| RESERVED | | | | | |
| (Album Name Block) | | | | | |
| ANMO | | 9 | | | |
| 497 | 0x0209 | ALBUM_NAME1 | 0x0209 | ARTIST1 | |
| 498 | 0x0000 | 0 | 0x0000 | 0 | |
| 499 | | | | | |
| 500 | 0x0209 | ALBUM_NAME62 | 0x0209 | ARTIST62 | |
| | | | | | |
| | | | | | |
| RESERVED | | | | | |
| TNMO | | 10 | | | |
| 1 | 0x0209 | TRACK_NAME1 | 0x0209 | ARTIST1 | |
| 2 | 0x0000 | 0 | 0x0000 | 0 | |
| | | | | | |
| 61 | 0x0209 | TRACK_NAME61 | 0x0209 | ARTIST61 | |
| 62 | 0x0209 | TRACK_NAME62 | 0x0209 | ARTIST62 | |
| RESERVED | | | | | |
| Audio-Data-File Name Block | | | | | |
| TNMO | | 332 | | | |
| 19965 | 0x0209 | TRACK_NAME19965 | 0x0209 | ARTIST19972 | |
| 19966 | 0x0000 | 0 | 0x0000 | 0 | |
| | | | | | |
| 19999 | 0x0209 | TRACK_NAME19999 | 0x0209 | ARTIST19999 | |
| 20000 | 0x0209 | TRACK_NAME20000 | 0x0209 | ARTIST20000 | |
| | | | | | |
| | | | | | |
| | | | | | |
| | | | | | |
| RESERVED | | | | | |

131: (Album portion containing 133, 134)
132: (Track portion containing 135, 136)

| 161 → | TRK0 | 1 | | | |
|---|---|---|---|---|---|
| 162 { | 1 | 1 | 10320 | 1 | 1 |
| | 2 | 1 | 7740 | 1 | 2 |
| | 3 | 2 | 12900 | 2 | 1 |
| | 4 | 0 | 0 | 0 | 0 |
| | | | | | |
| | | | | | |
| | 1364 | 0 | 0 | 0 | 0 |
| | 1365 | 0 | 0 | 0 | 0 |
| 163 → | RESERVED | | | | |
| | TRK0 | 2 | | | |
| | 1366 | 0 | 0 | 0 | 0 |
| | | | | | |
| | | | | | |
| | 2729 | 0 | 0 | 0 | 0 |
| | 2730 | 0 | 0 | 0 | 0 |
| | RESERVED | | | | |
| | Block 3~14 | | | | |
| | TRK0 | 15 | | | |
| | 19111 | 0 | 0 | 0 | 0 |
| | | | | | |
| | | | | | |
| | 19999 | 500 | 10320 | 0 | 0 |
| | 20000 | 499 | 9030 | 500 | 1 |
| | | | | | |
| | | | | | |
| | RESERVED | | | | |

FIG. 17

| 171 → BLK-ID | Block Serial Number ← 172 |
|---|---|
| 4 Bytes | 4 Bytes |

FIG. 18

| Audio-Data-File Number | Album File Number | Audio-Data-File Total SU | TOCDB IDX | TOC TNO |
|---|---|---|---|---|
| 2 Bytes | 2 Bytes | 4 Bytes | 2 Bytes | 2 Bytes |
| 181 | 182 | 183 | 184 | 185 |

FIG. 19

- 191 — BLK Record
- 192-1 — ALBUM TOC Record
- 192-2 — ALBUM TOC Record
- 192-500 — ALBUM TOC Record
- 193 — RESERVED Record

FIG. 20

| BLK-ID | Block Serial Number | Numbers of Album |
|---|---|---|
| 4 Bytes | 4 Bytes | 4 Bytes |
| 201 | 202 | 203 |

FIG. 21

| TOC DB IDX | State of Use | TOC Information | ... | TOC Information |
|---|---|---|---|---|
| 2 Bytes | 2 Bytes | 4 Bytes | ... | 4 Bytes |

211 — TOC DB IDX
212 — State of Use
213-1 — TOC Information
102 — ...
123-103 — TOC Information

FIG. 22

| Trk No. | AMIN | ASEC | AFRAME |
|---|---|---|---|
| 1 Byte | 1 Byte | 1 Byte | 1 Byte |

| BLK Record |
| TOC RECORDED Record |
| TOC RECORDED Record |
| TOC RECORDED Record |
| RESERVED Record |

231 — BLK Record
232-1 — TOC RECORDED Record
232-2 — TOC RECORDED Record
232-500 — TOC RECORDED Record
233 — RESERVED Record

| 241 | 242 | 243 |
|---|---|---|
| BLK-ID | Block Serial Number | Numbers of Album |
| 4 Bytes | 4 Bytes | 4 Bytes |

| 251 | 252 | 253 | 254 |
|---|---|---|---|
| RECORDED DB IDX | TOC DB IDX | Album Number | Recorded Flag |
| 2 Bytes | 2 Bytes | 2 Bytes | 101 Bytes |

| 261 | 262 | 263-1 | 263-2 | ····· | 263-99 |
|---|---|---|---|---|---|
| FTNO | LTNO | Tr1 | Tr2 | ····· | Tr99 |
| 1 Byte | 1 Byte | 1 Byte | 1 Byte | ····· | 1 Byte |

291 Forwards Audio Data File  292 Resume Reproduction

FIG. 34

| PTNO | TNO | AMSEC | STS |
|---|---|---|---|
| 1 | 1 | T(1) | OK |
| 2 | 2 | T(2) | NG |
| 3 | 6 | T(3) | OK |
| 4 | 7 | T(4) | NG |
| 5 | 8 | T(5) | NG |
| 6 | 3 | T(6) | OK |
| 7 | 4 | T(7) | OK |
| 8 | 5 | T(8) | NG |
| 9 | 10 | T(9) | OK |
| 10 | 11 | T(10) | NG |
| 11 | 16 | T(11) | NG |
| 12 | 16 | T(12) | NG |
| 13 | 15 | T(13) | NG |
| 14 | 4 | T(14) | OK |
| 15 | 5 | T(15) | OK |
| 16 | 9 | T(16) | NG |
| 17 | 12 | T(17) | OK |
| 18 | 13 | T(18) | NG |
| 19 | 1 | T(19) | NG |
| 20 | 3 | T(20) | OK |
| 21 | 4 | T(21) | OK |
| 22 | 5 | T(22) | NG |
| 23 | 9 | T(23) | NG |
| 24 | 7 | T(24) | OK |
| 25 | 8 | T(25) | OK |
| 26 | 9 | T(26) | OK |
| 27 | 10 | T(27) | OK |
| 28 | 11 | T(28) | NG |
| 29 | 13 | T(29) | NG |
| 30 | 14 | T(30) | NG |
| 31 | 15 | T(31) | OK |
| 32 | 16 | T(32) | OK |

(PRIOR ART)
FIG. 39
| 371<br>Audio Data<br>File No. | 372<br>CD<br>Title |
|---|---|
| 1. | AAA |
| 2. | BBBB |
| 3. | CC |
| 4. | DDDDD |
| 5. | E |
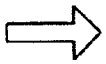
| | 374<br>Normal<br>Reproduction | 373<br>Ripping<br>Result |
|---|---|---|
| 1. | AAA | MP3 |
| 2. | BBBB | MP3 |
| 3. | CC | MP3 |
| 4. | DDDDD | MP3 |
| 5. | E | MP3 |
376 ≠
Not Correspond
375 Reproduce in Optimal Order
(e.g. Random Playback, User's Input)
| 1. | AAA | MP3 | |
|---|---|---|---|
| 2. | CC | MP3 | If Reproduce<br>as It is |
| 3. | E | MP3 | |
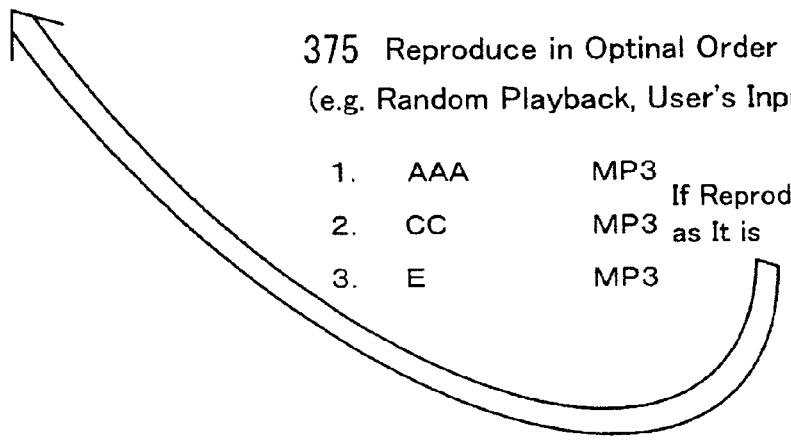

METHOD AND APPARATUS FOR RECORDING AUDIO TRACKS INTO LARGE STORAGE DEVICE

TECHNICAL FIELD

The present invention relates to a recording and reproducing apparatus as well as a recording and reproducing method for recording, for example, audio data reproduced from a CD (Compact Disc) simultaneously in HDD (Hard Disc Drive) and reproducing the recorded audio data.

BACKGROUND ART

In the past, there was an audio system in which audio data reproduced from the CD that is a disc-shaped recording medium only for reproduction is recorded in a MD (Mini Disc) that is a recordable disc-shaped recording medium. In this case, under limitations of a storage capacity of the recordable disc-shaped recording medium and the like, when two channels of right and left stereo audio data are recorded, for example, eighty minutes' recording could be made at most. When monaural audio data is recorded, for example, one hundred and forty minutes' recording could be made at most.

However, since the recording medium becomes greater in its storage capacity and lower in price these days, the recording medium becomes able to store an incomparably large amount of audio data than before for a long time. Therefore, a user can now enjoy the recording and reproducing of audio data using an inexpensive recording medium by reproducing the stored audio data.

Thus, a hard disc drive (hereinafter referred to as HDD) has been employed for a typical recording medium having such a large capacity. In a recording and reproducing system, when audio data is reproduced from CD, the reproduced audio data is simultaneously recorded in HDD and then the recorded audio data will be reproduced later.

FIG. 38 is a diagram showing a conventional recording and reproducing system.

In FIG. 38, audio data reproduced from CD 361 is amplified by an amplifier 362 and then outputted from a speaker 363 as music. At the same time, the audio data reproduced from CD 361 is compressed in a ripping section 364 to be recorded in HDD 365. Japanese Published Patent Application No. 2001-110171 discloses a technique capable of easily retrieving a large amount of music data which are copied and accumulated from CD into a built-in recording medium. Japanese Published Patent Application No. 2000-224523 discloses a technique capable of recording and reproducing a large amount of data efficiently using management data in a state capable of making fast access by reproducing file data recorded in a recording medium based on stored head position data and record length data. Japanese Published Patent Application No. H9-311799 discloses a technique capable of managing more intuitively a desired music in a desired disc, when music data stored on a plurality of discs are recorded on a hard disc.

DISCLOSURE OF INVENTION

In the above-described conventional recording and reproducing system, like a conventional reproducing method shown in FIG. 39, from CD 361 are reproduced "AAA" as CD title (372) for audio data file NO. 1 (371), "BBBB" as CD title (372) for audio file NO. 2 (371), "CC" as CD title (372) for audio file NO. 3 (371), "DDDDD" as CD title (372) for audio data file NO. 4 (371), and "E" as CD title (372) for audio data file NO. 5 (371).

In this case, on HDD 365 are recorded each file of "AAA.MP3" as a ripping result 373 for order 1 of normal reproduction (374), "BBBB.MP3" as a ripping result 373 for order 2 of normal reproduction 374, "CC.MP3" as a ripping result 373 for order 3 of normal reproduction 374, "DDDDD.MP3" as a ripping result 373 for order 4 of normal reproduction 374, and "E.MP3" as a ripping result 373 for order 5 of normal reproduction 374. However, because all files of audio data reproduced from CD 361 are recorded on HDD 365, a user may record repeatedly on HDD 365 an audio data file which he has ever reproduced from CD 361. This will cause inconvenience of increasing a waste of time and a storage capacity.

Moreover, for example, when the order is changed or deleted optionally by random reproduction or user's input in HDD 365 with the result that "AAA.MP3" as a reproducing file 375 in optional order 1, "CC.MP3" as a reproducing file 375 in optional order 2, and "E.MP3" as a reproducing file 375 in optional order 3 are generated, if the reproducing files in optional order are reproduced as it is, as shown with 376, they will not correspond to each CD title 372 for the audio data file NO. 1 to 5 (371) described above. This raises inconvenience that it is impossible to make them correspond to the original reproduction order of CD.

Furthermore, a track change has been detected by a recording unit of HDD detecting data contained in a subcode Q sent out by a CD reproducing unit, but this method causes inconvenience in which a contradiction will occur that the number of tracks recognized as reproduced in the CD reproducing unit does not correspond with the number of tracks recorded in the HDD recording unit.

In this context, a difference between audio data as an object of the present invention and general computer data will be described below. The computer data is capable of moving files in ascending order or descending order by operating the files, and cutting a file size at an end of size. In contrast, since the audio data is continuous, the file itself undergoes no operation and a reproduction order of CD is unrelated to a file name. Moreover, information as to how many audio data files have been reproduced before the relevant track to be reproduced is significant information in a reproducing of audio data. Furthermore, it is necessary for user's operation that a recording order in HDD is a reproduction order in CD, so that generating such a record list in HDD is requested. Furthermore, because it is required that only tracks reproduced completely from CD are recorded on HDD, a move list involved by movement of recorded tracks must be generated. Since a position of reproduced audio data file in CD can be known by TOC, the information on TOC should be utilized.

The present invention has been made in view of the foregoing points, and has an object to provide a recording and reproducing apparatus and a recording and reproducing method capable of making data corresponding to original data without recording data repeatedly.

The recording and reproducing apparatus according to the present invention includes: reproducing means for reproducing main data and first management data for managing the main data that are recorded in a first recording medium; recording and reproducing means for recording in and reproducing from a second recording medium the main data and second management data for managing the main data to be recorded that are reproduced from the first recording medium; end detection means for detecting an end of each track of the main data reproduced by the reproducing means; complete reproducing detection means for detecting that the reproducing of track has been made completely; management data renewal means for renewing the second management data recorded in the second recording medium based on results detected by the end detection means and the complete reproducing detection means; and control means for controlling recording of the main data reproduced from the first recording medium in the second recording means based on the second management data and for controlling the management data renewal means so that the second management data may be renewed when the main data is recorded in the second recording medium.

The recording and reproducing method according to the present invention is such one that is employed in an apparatus including a reproducing means for reproducing main data and first management data for managing the main data that are recorded in a first recording medium, a recording and reproducing means for recording in and reproducing from a second recording medium the main data and second management data for managing the main data to be recorded that are reproduced from the first recording medium, and a control means for performing various controls, in which the main data is recorded or reproduced based on the second management data. The method includes an end detection step of detecting an end of each track of the main data reproduced by the reproducing means, a complete reproducing detection step of detecting that the reproducing of track has been made completely, a management data renewal step of renewing the second management data recorded in the second recording medium based on results detected in the end detection step and the complete reproducing detection step, and a control step of controlling recording of the main data reproduced from the first recording medium in the second recording medium based on the second management data and controlling the management data renewal step so that the second management data may be renewed by the control means when the main data has been recorded in the second recording medium.

Thus, according to the present invention the following operation is performed.

The main data and the first management data for managing the main data are recorded in the first recording medium. The reproducing means reproduces the main data and the first management data for managing the main data which are recorded in the first recording medium.

In the second recording medium are recorded the main data and the second management data for managing the main data. The recording and reproducing means records the main data and the second management data for managing the main data in the second recording medium, and reproduces from the second recording medium.

End detection means detects an end of each track of the main data reproduced by the reproducing means. Complete reproducing detection means detects that the reproduction of track has been completed. Renewal means renews the second management data recorded in the second recording medium based on results detected by the end detection means and the complete reproducing detection means.

The control means controls the recording of the main data reproduced from the first recording medium in the second recording medium based on the second management data, and controls the renewal means so that the second management data may be renewed when the main data has been recorded in the second recording medium. On this occasion, generating means generates a move list of file of the main data based on the second management data renewed by the renewal means.

Divider means divides the main data to be recorded in the second recording medium based on an end detection signal of each track of the main data from the end detection means and records the divided data.

BRIEF DESCRIPTION OF DRAWINGS

FIG. 10 is a diagram showing an album playback list (Pblist. msf);

FIG. 11 is a diagram showing a playback list (Pbxxxxxx. msf);

FIG. 13 is a diagram showing details of Namedb. msf;

FIG. 16 is a diagram showing details of Playtime. msf;

FIG. 17 is a diagram showing a block-ID portion of Playtime. msf;

FIG. 18 is a diagram showing a TRK record portion of Playtime. msf;

FIG. 19 is a diagram showing details of Tocdb. msf;

FIG. 20 is a diagram showing. a block-ID portion of Tocdb. msf;

FIG. 21 is a diagram showing ALBUM TOC record of Tocdb. msf;

FIG. 22 is a diagram showing TOC data of ALBUM TOC record of Tocdb. msf;

FIG. 23 is a diagram showing details of Recorded. msf;

FIG. 34 is a diagram showing a locus table of reproducing;

FIG. 39 is a diagram showing a conventional reproducing method.

BEST MODE FOR CARRYING OUT THE INVENTION

An embodiment according to the present invention will be described below with reference to accompanying drawings.

Figure 1:
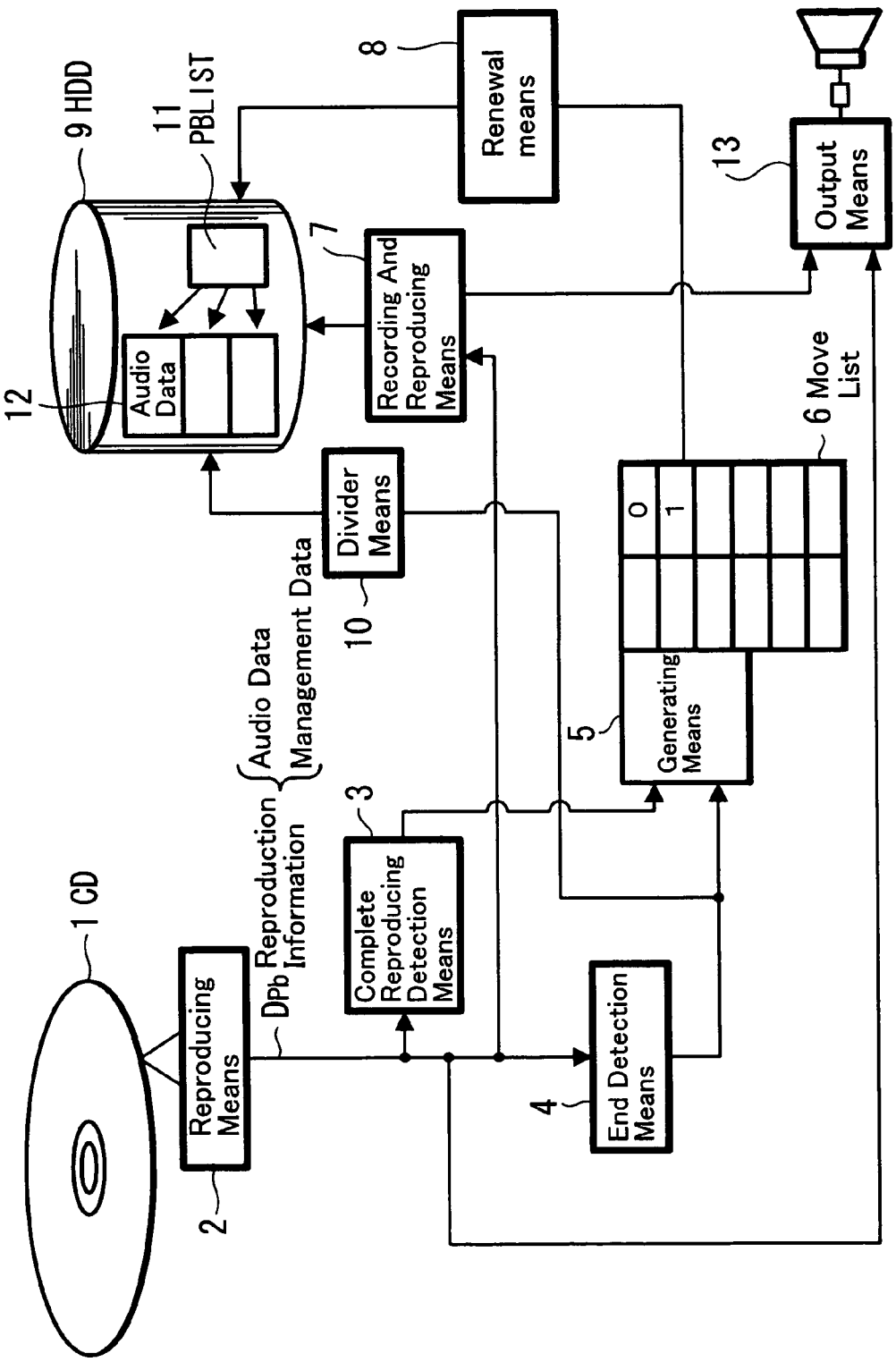
FIG. 1 is a block diagram showing a recording and reproducing apparatus according to an embodiment of the present invention.

FIG. 1 is a block diagram showing the structure of a recording and reproducing apparatus according to the embodiment. To begin with, the structure of this recording and reproducing apparatus will be described first. In FIG. 1, CD 1 denotes the first recording medium in which audio data as the main data and management data as the first management data for managing the main data are recorded. Reproducing means 2 has a function of reproducing the main data and the first management data for managing the main data that are recorded on CD 1 as the first recording medium and of outputting them through output means 13.

HDD 9 is the second recording medium, in which audio data 12 as the main data and PBLIST 11 as the second management data for managing the main data are recorded. A recording and reproducing means 7 has a function of recording audio data 12 as the main data reproduced from CD 1 as the first recording medium and PBLIST 11 as the second management data for managing audio data 12 as the main data to be recorded, in HDD 9 as the second recording medium and of reproducing the recorded data.

End detection means 4 has a function of detecting an end of each track of the main data reproduced by the reproducing means 2. Complete reproducing detection means 3 has a function of detecting that the reproduction of track has been completed. Renewal means 8 has a function of renewing PBLIST 11 as the second management data to be recorded in HDD 9 as the second recording medium based on results detected by the end detection means 4 and the complete reproducing detection means 3.

Generating means 5 has a function of controlling the recording of audio data as the main data reproduced from CD 1 as the first recording medium in HDD 9 as the second recording medium based on PBLIST 11 as the second management data, and of controlling the renewal means 8 so that PBLIST 11 as the second management data may be renewed when audio data 12 as the main data has been recorded in HDD 9 as the second recording medium. On this occasion, the generating means 5 has a function of generating a move list of files of audio data 12 as the main data based on PBLIST 11 as the second management data renewed by the renewal means 8.

Divider means 10 divides audio data 12 as the main data to be recorded in HDD 9 as the second recording medium based on an end detection signal in each track of the main data from the end detection means 4 before recording.

Next, the operation of the recording and reproducing apparatus thus constructed will be described.

Figure 2:
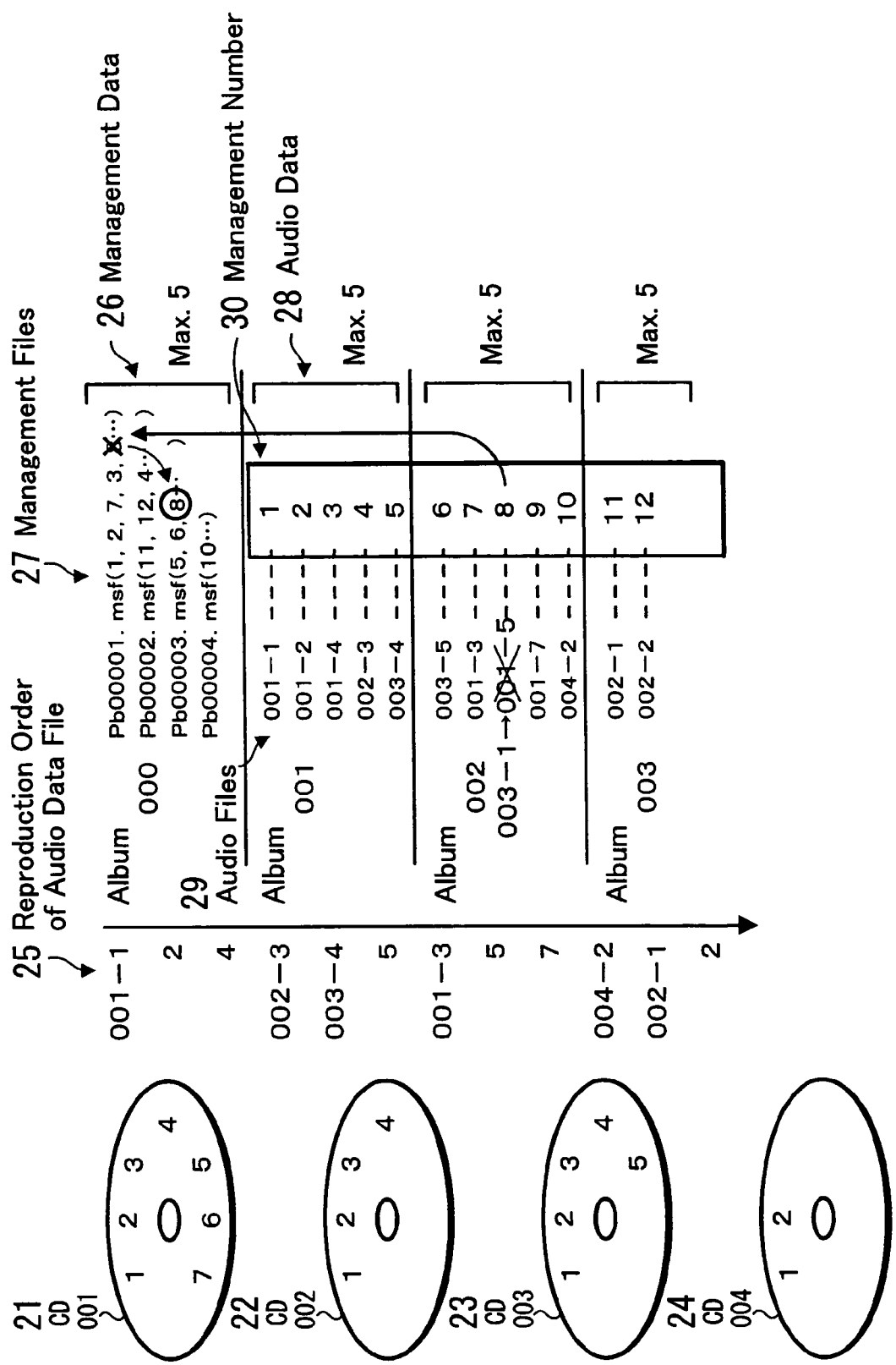
FIG. 2 is a diagram showing the management of reproduced audio data file.

FIG. 2 is a diagram showing reproduction management of audio data files.

In FIG. 2, on CD 001 (21) are recoded audio data files 1, 2, 3, 4, 5, 6 and 7; on CD 002 (22) are recorded audio data files 1, 2, 3 and 4; on CD 003 (23) are recorded audio data files 1, 2, 3, 4 and 5; on CD 004 (24) are recorded audio data files 1 and 2.

On this occasion, as indicated by reproduction order of audio data file 25 reproduced from CD 1 shown in FIG. 1, it is assumed that in CD 001 (21) after audio data files 1 and 2 are reproduced, audio data file 3 is not reproduced; audio data file 4 is reproduced; the following audio data files 5, 6, and 7 are not reproduced. The reproduction is then moved to the next CD 002 (22). Thus, reproduction order of audio data file 25 at this time becomes "001-1", "001-2" and "001-4".

In CD 002 (22), audio data files 1 and 2 are not reproduced and only audio data file 3 is reproduced. The reproducing is then moved to the next CD 003 (23) without reproducing audio data file 4. Reproduction order of audio data file 25 at this time becomes "002-3".

In CD 003 (23), audio data files 1, 2 and 3 are not reproduced and audio data files 4 and 5 are reproduced. Reproduction order of audio data file 25 at this time becomes "003-4" and "003-5".

Subsequently, the reproduction is returned to the previous CD 001 (21), from which audio data files 3, 5 and 7 that were not reproduced before are reproduced. The reproduction is then moved to the next CD 004 (24). Reproduction order of audio data file 25 at this time becomes "001-3", "001-5" and "001-7".

In CD 004 (24), an audio data file 1 is not reproduced and an audio data file 2 is reproduced. Reproduction order of audio data file 25 at this time becomes "004-2".

Subsequently, the reproduction returns to the previous CD 002 (22), from which audio data files 1 and 2 that were not reproduced before are reproduced. Reproduction order of audio data file 25 at this time becomes "002-1" and "002-2".

Then management data 26 and audio data 28 are recorded on HDD 9 shown in FIG. 1. The management data 26 corresponds to PBLIST 11 and the audio data 28 corresponds to audio data 12. It is noted here that the reproduction order of audio data file 25 comes from a reproduction by user's input operation or a random reproduction by random number generation.

In album 001 of the audio data 28 are recorded "001-1", "001-2", "001-4", "002-3" and "003-4" as audio files 29 up to five at maximum in order shown by the above-described reproduction order of audio data file 25. As management number 30 at this time are recorded "1" for audio file 29 "001-1", "2" for audio file "001-2", "3" for "001-4", "4" for "002-3", and "5" for "003-4".

Subsequently, in album 002 are recorded "003-5", "001-3", "001-5", "001-7", and "004-2" as audio files 29 up to five at maximum in order shown by the above-described reproduction order of audio data file 25. As management number 30 at this time are recorded "6" for audio file 29 "003-5", "7" for "001-3", "8" for "001-5", "9" for "001-7" and "10" for "004-2".

Subsequently, in album 003 are recorded "002-1" and "002-2" as audio files 29 up to five at maximum in order shown by the above-described reproduction order of audio data file 25. As management number 30 at this time are recorded "11" for audio file 29 "002-1" and "12" for "002-2".

In album 000 of management files 27 are recorded "Pb00001. msf (1, 2, 7, 3, 8 . . . )", "Pb0002. msf (11, 12, 4 . . . )", "Pb00003. msf (5, 6 . . . )" and "Pb00004. msf (10 . . . ) as management files 27 up to five at maximum in order shown by original CD 001 (21), CD 002 (22), CD 003 (23) and CD 004 (24) from which the above-described audio files 29 are derived.

At this moment, to management file (27) "Pb00001. msf" of CD 001 (21) is recorded reproduction order of CD 001 (21) as (1, 2, 7, 3, 8 . . . ) making the management number an attribute. To management file (27) "Pb00002. msf" of CD 002 (22) is recorded reproduction order of CD 002 (22) as (11, 12, 4 . . . ) making an attribute of the management number. For "Pb00003. msf" of the management file 27 of CD 003 (23) is recorded as (5, 6 . . . ) making an attribute of the management number. For "Pb00004. msf" of the management file 27 of CD 004 (24), reproduction order of CD 004 (24) is recorded as (10 . . . ) making an attribute of the management number.

At this moment, for example, when audio file 29 "001-5" of management number "8" of album 002 in audio data 28 is changed to "003-1" by renewing operation of the renewal means 8 shown in FIG. 1, the management number "8" as an attribute indicating reproduction order of CD 001 (21) for management file 27 "Pb00001. msf" of album 000 in management data 26 is deleted and then added to reproduction order of CD 003 (23) for "Pb0003. msf".

Figure 3:
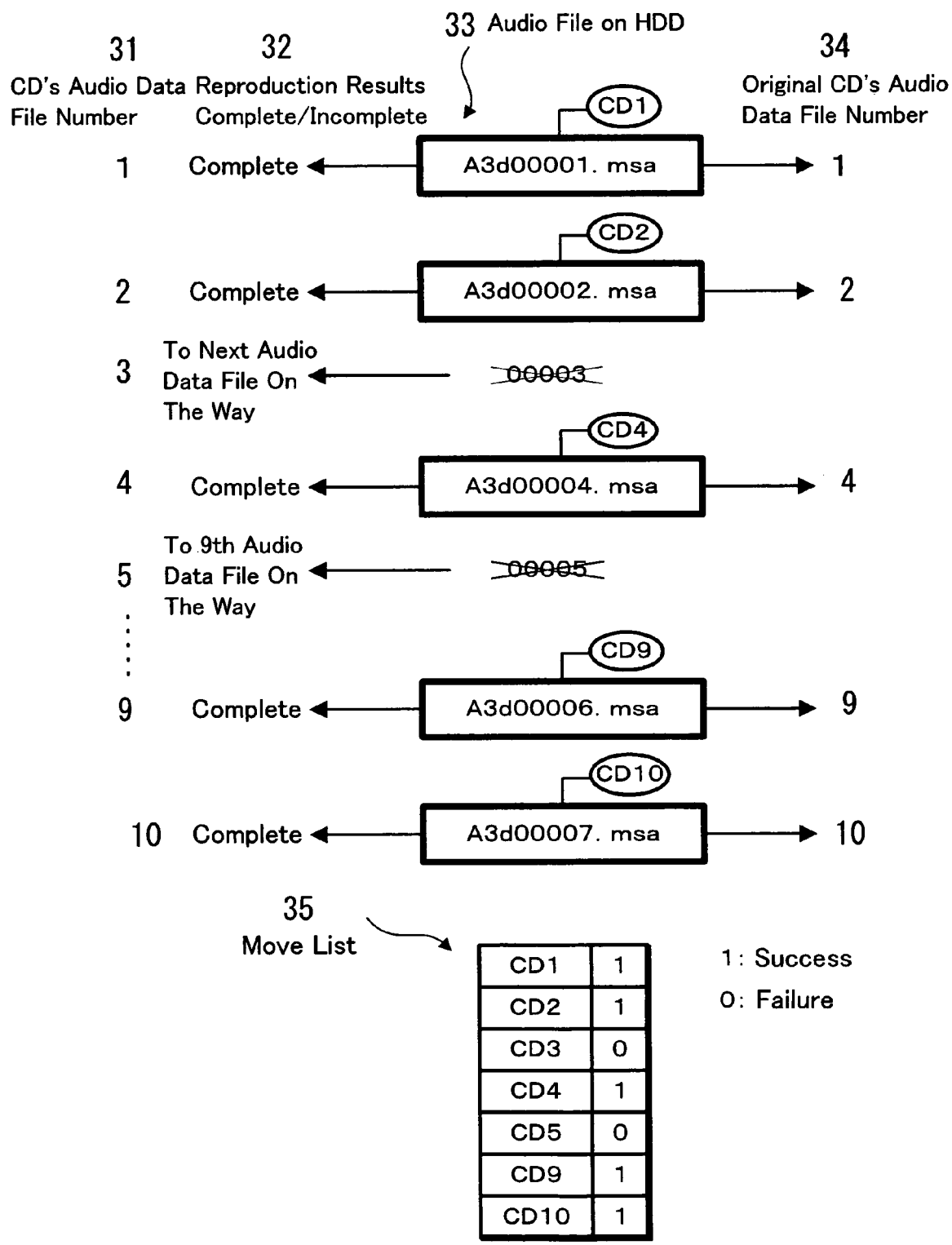
FIG. 3 is a diagram showing the move list according to reproduction results.

FIG. 3 is a diagram showing the move list of reproduction results. In FIG. 3, a reproduction result 32 of CD's audio data file number 31 "1" is a complete state in which all reproduction has been finished. An audio-file-on-HDD 33 at this time is "A3d00001. msa" for CD 1 and an original CD's audio data file number 34 is "1".

The reproduction result 32 of CD's audio data file number 31 "2" is a complete state in which all reproduction has been finished. The audio-file-on-HDD 33 at this time is "A3d00002. msa" for CD 2 and the original CD's audio data file number 34 is "2".

The reproduction result 32 of CD's audio data file number 31 "3" is an incomplete state in which the reproducing shifts to the next audio data file on the way. The audio-file-on-HDD 33 at this time "A3d00003. msa" for CD 3 is not recorded.

The reproduction result 32 of CD's audio data file number 31 "4" is a complete state in which all reproduction has been finished. The audio-file-on-HDD 33 at this time is "Ad300004. msa" for CD 4 and the original audio data file number 34 is "4".

The reproduction result 32 of CD's audio data file number 31 "5" is an incomplete state in which the reproducing shifts to the ninth audio data file on the way. The audio-file-on-HDD 33 at this time "A3d00005. msa" for CD 5 is not recorded.

The reproduction result 32 of CD's audio data file number 31 "9" is a complete state in which all reproduction has been finished. The audio-file-on-HDD 33 at this time is "A3d00006. msa" for CD 9 excluding CD's audio data file numbers 6 to 8 that are not yet reproduced. The original CD's audio data file number 34 is "9".

The reproduction result 32 of CD's audio data file number 31 "10" is a complete state in which all reproduction has been finished. The audio-file-on-HDD 33 at this time is "A3d00007. msa" for CD 10 and the original CD's audio data file number 34 is "10".

At this moment, the generating means 5 shown in FIG. 1 generates the move list 35 depending on whether the reproduction result of original CD's audio data file number is a complete state in which all reproduction has been finished or an incomplete state in which reproduction is interrupted on the way. The move list indicates whether or not the audio file stored in a buffer area that is a temporary storage area on HDD is moved to a recording area that is a permanent storage area, making only the complete state excluding the incomplete state correspond to the original CD's audio data file number.

In the move list 35, since the reproduction result 32 of CD's audio data file number 1 is the complete state in which all reproduction has been finished, "1" indicating success is recorded. Since the reproduction result 32 of CD's audio data file number 2 is the complete state in which all reproduction has been finished, "1" indicating success is recorded.

Since the reproduction result 32 of CD's audio data file number 3 is the incomplete state in which reproduction is moved to the next data file on the way, "0" indicating failure is recorded. Since the reproduction result 32 of CD's audio data file number 4 is the complete state in which all reproduction has been finished, "1" indicating success is recorded.

Since the reproducing 32 of CD's audio data file number 5 is the incomplete state in which reproduction is moved to the next audio data file on the way, "0" indicating failure is recorded. Since the reproduction result 32 of CD's audio data file number 9 is the complete state in which all reproduction has been finished, "1" indicating success is recorded. Since the reproduction result 32 of CD's audio data file number 10 is the complete state in which all reproduction has been finished, "1" indicating success is recorded.

In the following, a recording and reproducing apparatus according to an embodiment of the present invention will be described with reference to a CD reproducing unit and a HDD recording and reproducing unit. First of all, CD/HD integrated dubbing system will be described below.

Figure 4:
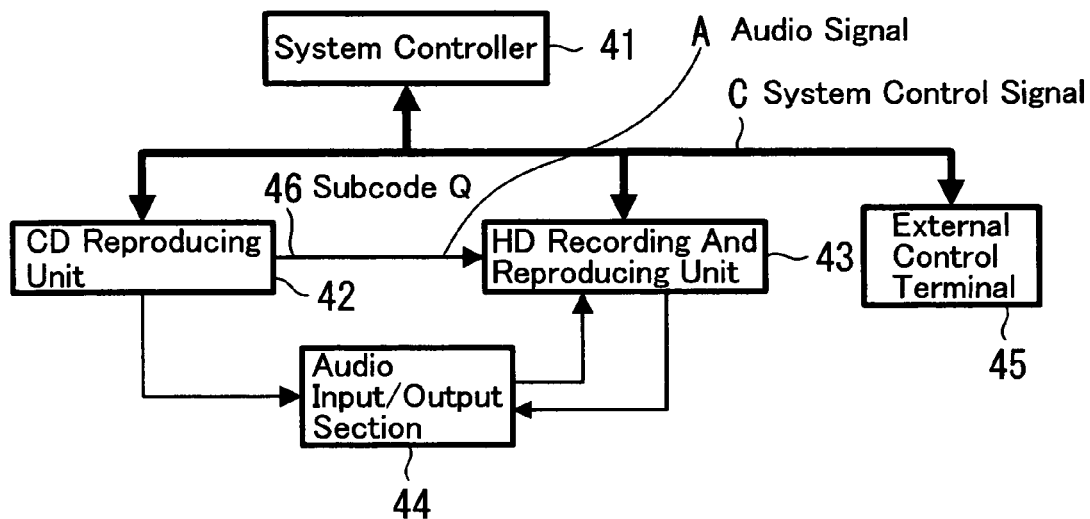
FIG. 4 is a diagram showing a schematic structure of a dubbing system applied to the embodiment.

FIG. 4 is a diagram showing the structure of the dubbing system according to this embodiment. The dubbing system includes a system controller 41 which supplies a system control signal C to each block for controlling thereof, a CD reproducing unit 42 for reproducing an audio signal A in conformity with IEC 60958 standard from CD, a HD recording and reproducing unit 43 which makes a track change based on subcode Q46 in the audio signal A and records the audio signal A as well as management data, an audio input/output section 44, and an external control terminal 45. The audio signal A has a control (C) bit and a user's (U) bit as biphase mark signal. The control (C) bit is for distinguishing: whether the digital signal is of consumer or business specification, whether the audio data is digital data or not, whether there is a copy right or not, to what category the reproducing equipment belongs and so on. The user's (U) bit has various subcodes, in which the subcode Q is included.

In FIG. 4, the system controller 41 uses the system control signal C to control each block. The audio signal A in conformity with IEC 60958 standard is input and output among the CD reproducing unit 42, HD recording and reproducing unit 43, and audio input/output section 44. However, since an input section of the audio input/output section 44 has an analog input portion, the audio signal A inputted in analog form is converted to digital form by A/D converter and a serial signal synchronized with L/R clock and bit clock BCLK is supplied to the HD recording and reproducing unit 43.

Moreover, the system control signal C is also connected to external control terminal 45 to enable communication with external equipment. By employing USB (Universal Serial Bus) usually used in an interface of personal computer (PC) as the external control terminal 45, communication with a personal computer is enabled. Furthermore, the system controller 41 also has functions of controlling user's key input operation and display for user.

Figure 5:
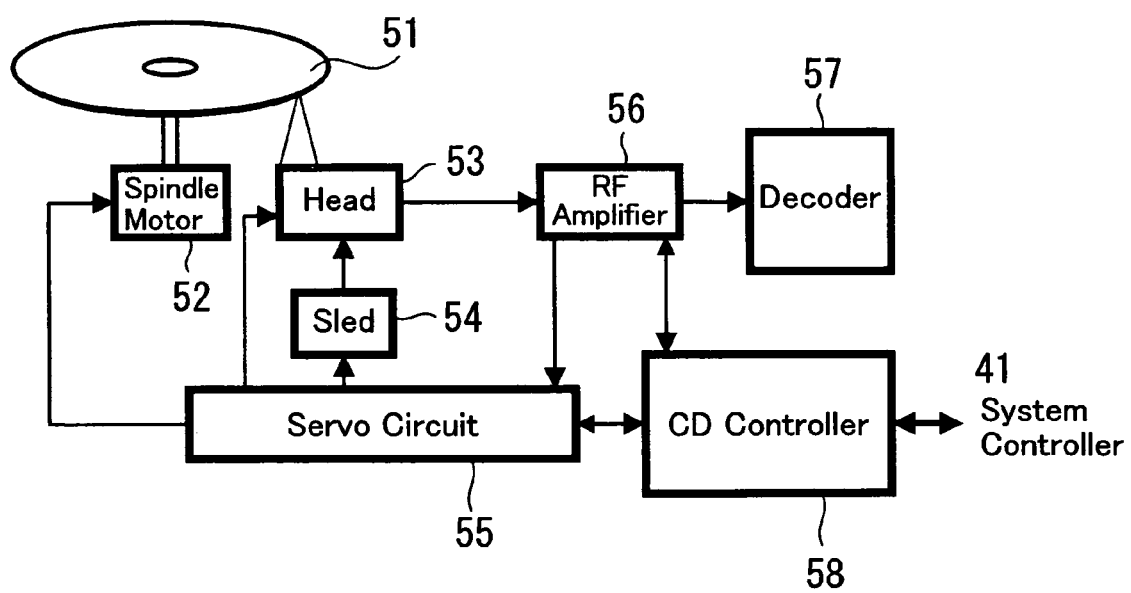
FIG. 5 is a diagram showing details of a CD reproducing unit.

FIG. 5 is a diagram showing the structure of the CD reproducing unit 42 shown in FIG. 4 in detail. In FIG. 5, the CD reproducing unit 42 is an optical disc unit only for reproduction. CD 51 is driven to rotate with a constant linear velocity by a spindle motor 52 during CD reproducing operation. An optical head 53 reads out data recorded on CD 51 in the form called pit and supplies the data to a RF amplifier 56. The optical head 53 is constructed such that it can be displaced in the tracking and focusing directions and also moved in a radial direction of CD 51 by a sled mechanism 54.

The RF amplifier 56 supplies a focusing error signal and a tracking error signal other than a reproduced RF signal to a servo circuit 55. The servo circuit 55 generates various drive signals such as a focusing drive signal, a tracking drive signal, a sled drive signal, and a spindle-motor drive signal from the focusing error signal and tracking error signal to control operations of the optical head 53, sled mechanism 54, and spindle motor 52.

The reproduced RF signal is supplied to a decoder 57. The decoder 57 binarizes the inputted reproduced RF signal to derive EFM (Eight to Fourteen Modulation) signal. Subsequently, the decoder 57 performs EFM demodulation, CIRC (Cross Interleave Reed-Solomon Code) decoding and the like on the derived EFM signal to decode the data read from CD 51 into a digital audio data form of 16 bit quantization and 44.1 kHz sampling. In this connection, the CIRC decoding means error detection and error correction processing that make use of CIRC, in which the error detection and error correction processing using well-known C1 and C2 codes is performed.

Moreover, the decoder 57 is designed to be capable of extracting control data such as TOC (Table Of Contents) and subcode. Those TOC and subcode are supplied to a CD controller 58 and used for various controls. The digital audio data output from the decoder 57 is supplied to the audio input/output section 44 shown in FIG. 4.

Figure 6:
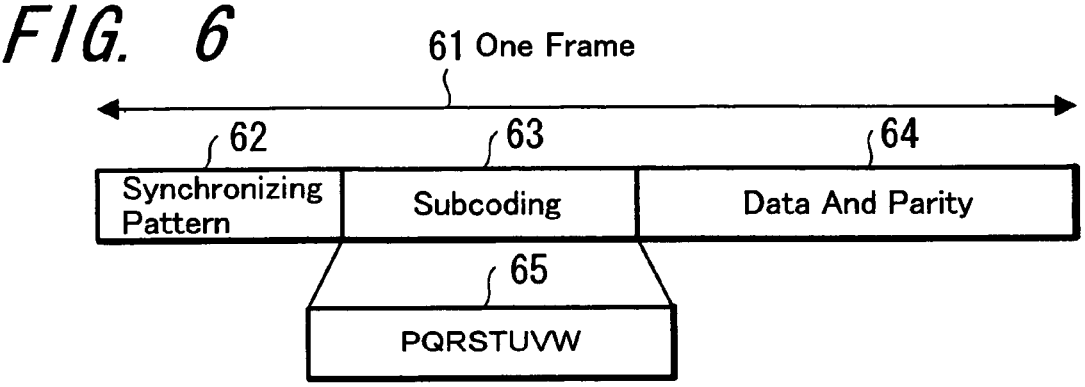
FIG. 6 is a diagram showing details of a frame obtained from the CD reproducing unit.

FIG. 6 is a diagram showing one frame 61 which is generated in the decoder 57 shown in FIG. 5 and forms a part of data supplied to the CD controller 58. The frame includes a synchronizing pattern portion 62 which is a signal that handles thirty-two frames collectively and is capable of detecting the front; a subcoding portion 63 having a program function of finding the beginning of audio data file and reproducing in accordance with preset order, and for obtaining characters and other data; and a digital audio data and parity portion 64. Further, the subcoding portion 63 has each subcode data P, Q, R, S, T, U, V and W as denoted by 65.

Figure 7:
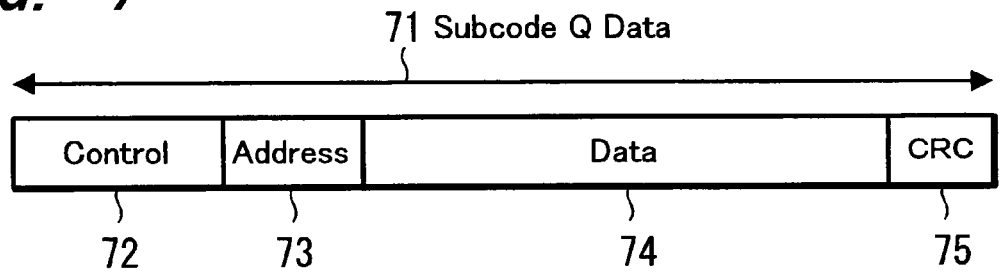
FIG. 7 is a diagram showing details of a subcode Q.

FIG. 7 is a diagram showing Q data of the subcoding portion 63 shown in FIG. 6. Subcode Q data 71 consists of a control portion 72 used for discriminating the number of audio channels, emphasis and digital data, an address portion 73 for indicating what data means, a data portion 74, and a CRC (Cyclic Redundancy Check) portion 75 as parity.

Figure 8:
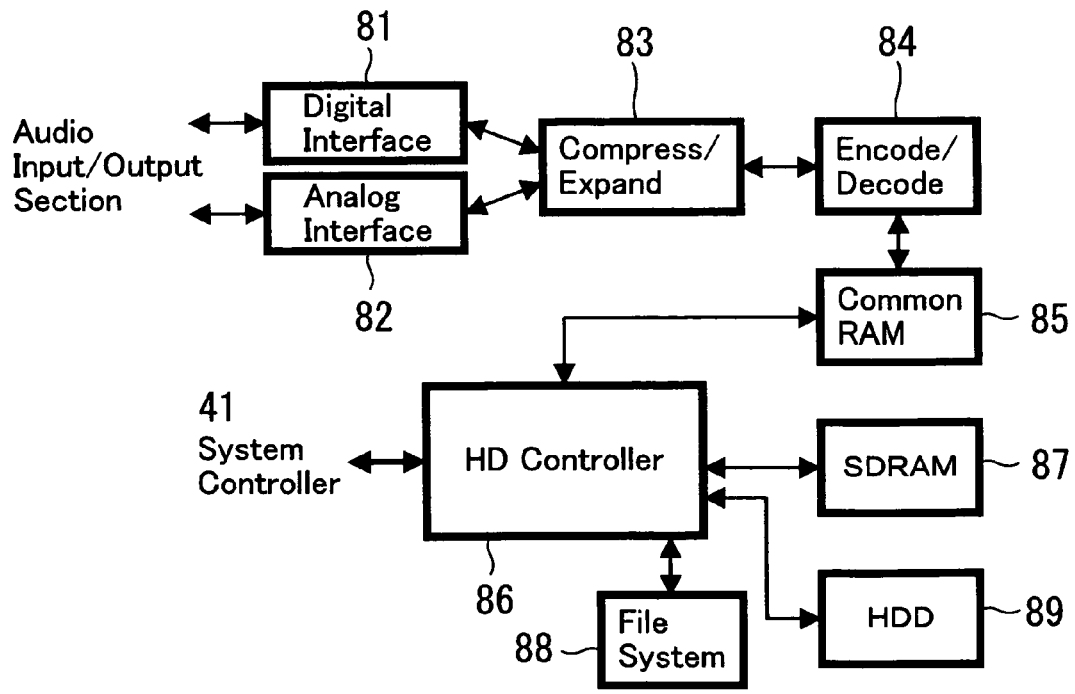
FIG. 8 is a diagram showing details of an HD recording and reproducing unit.

FIG. 8 is a diagram showing the structure of the HD recording and reproducing unit 43 shown in FIG. 4. The HD recording and reproducing unit 43 is one that has a function of recording and reproducing audio data such as audio signal and a function of recording data for managing the audio data or the like.

The HD recording and reproducing unit 43 is controlled by a HD controller 86 that is a microcomputer. The HD controller 86 and a HDD 89 are connected to each other through an IDE bus conforming to ATA, and writing and reading of data is a data transfer using a parallel input/output PIO mode. A file system 88 is one that is used when the HD controller 86 reads data from HDD 89 and writes data into HDD 89. This file system is indispensable for managing each file of data written into HDD 89.

Note that the file system 88 is software incorporated in the HD controller 86 and is not a physical existence as other blocks shown. All data to be recorded in HDD 89 are files that are managed in the file system 88. A database for audio data and audio management data described later on is also a file that is managed in the file system 88. The file system 88 is provided with a system call such as open, close, read and write of file necessary for file operation.

Next, a flow of recording audio data in the HD recording and reproducing unit 43 will be described. Recording audio data in the HD recording and reproducing unit 43 means that the HD controller 86 forms a file on HDD 89 using the file system 88. Thus, the HD controller 86 forms first a new file on HDD 89 using file system 88. The HD controller 86 controls a compressor and expander section 83 as well as an encoder/decoder 84 to start encoding and encrypting.

An audio signal input from the audio input/output section 44 is supplied to a digital interface 81 or an analog interface 82. The compressor and expander section 83 compresses the input audio signal of high sound quality with high efficiency by means of ATRAC (Adaptive TRansform Acoustic Coding) three-compression coding technique. The compressed audio data is next supplied to the encoder/decoder 84 to be encoded. The encoding is a function of encrypting contents of music having copyright and making mutual recognition between devices. The encrypted audio data is supplied to a common RAM 85.

On this occasion, each time encryption of one sound unit for about 23.2 msec has finished, the HD controller 86 is interrupted. Whenever the HD controller 86 is interrupted, data preserved in the common RAM (Random Access Memory) 85 is transferred to SDRAM (Synchronous Dynamic RAM) 87 and further to HDD 89 through the file system 88. The audio data is recorded on HDD 89 as a file.

Moreover, when audio data conforming to IEC 60958 is recorded and its category is CD, the HD recording and reproducing unit 43 can find how many tracks of CD have been recorded before the track under recording by writing a track number TNO contained in control (C) bit of audio data and user's (U) bit into TOC TNO entry of TRK record portion in a playlist Playtime. msf described later on.

Next, a flow of reproducing audio data using the HD recording and reproducing unit 43 will be described. Reproducing audio data using the HD recording and reproducing unit 43 means that the HD controller 86 opens audio file recorded on HDD 89 to read the audio data.

The HD controller 86 controls first the compressor and expander section 83 as well as encoder/decoder 84 to start decoding and decrypting. The HD controller 86 opens a file desired to reproduce using the file system 88. The HD controller 86 reads the opened file from HDD 89 into SDRAM 87. The data read in SDRAM 87 is transferred to the common RAM 85 by HD controller 86. The data transferred to the common RAM 85 is decrypted by the encoder/decoder 84. The decrypted data is supplied to the compressor and expander section 83 and then supplied to the audio input/output section 44 through the digital interface 81 or analog interface 82.

At this moment, the same as in recording, each time decrypting of one sound unit has finished, the HD controller 86 is interrupted. On each interruption, the HD controller 86 transfers the next sound unit to common RAM 85, thus making the reproduction continue.

Hereupon, the HD recording and reproducing unit 43 of dubbing system according to the embodiment of the present invention in which the CD reproducing unit 42 is integrated with the HD recording and reproducing unit 43 is provided in advance with a plurality of, for example, five hundred means called albums for grouping audio tracks. Furthermore, in addition to the albums there are ten means called playlist capable of gathering arbitrary tracks. The difference between the album and playlist is that the former is means for recording prerecorded data itself, whereas the latter has a link to audio data stored in the former means and does not store audio file substance itself.

The number of audio file capable of being recorded in the HD recording and reproducing unit 43 is four hundred per album. In other words, four hundred audio data files per album can be recorded. This limitation of the number of tracks within the album is also applied to the playlist. Therefore, audio data of 500 albums×400 tracks=200,000 audio data files at maximum can be stored. However, the dubbing system according to the this embodiment in which the CD reproducing unit 42 is integrated with the HD recording and reproducing unit 43 is provided with a limitation of 20,000 audio data files at maximum in order to ensure appropriate recording and reproducing of audio data.

Figure 9:
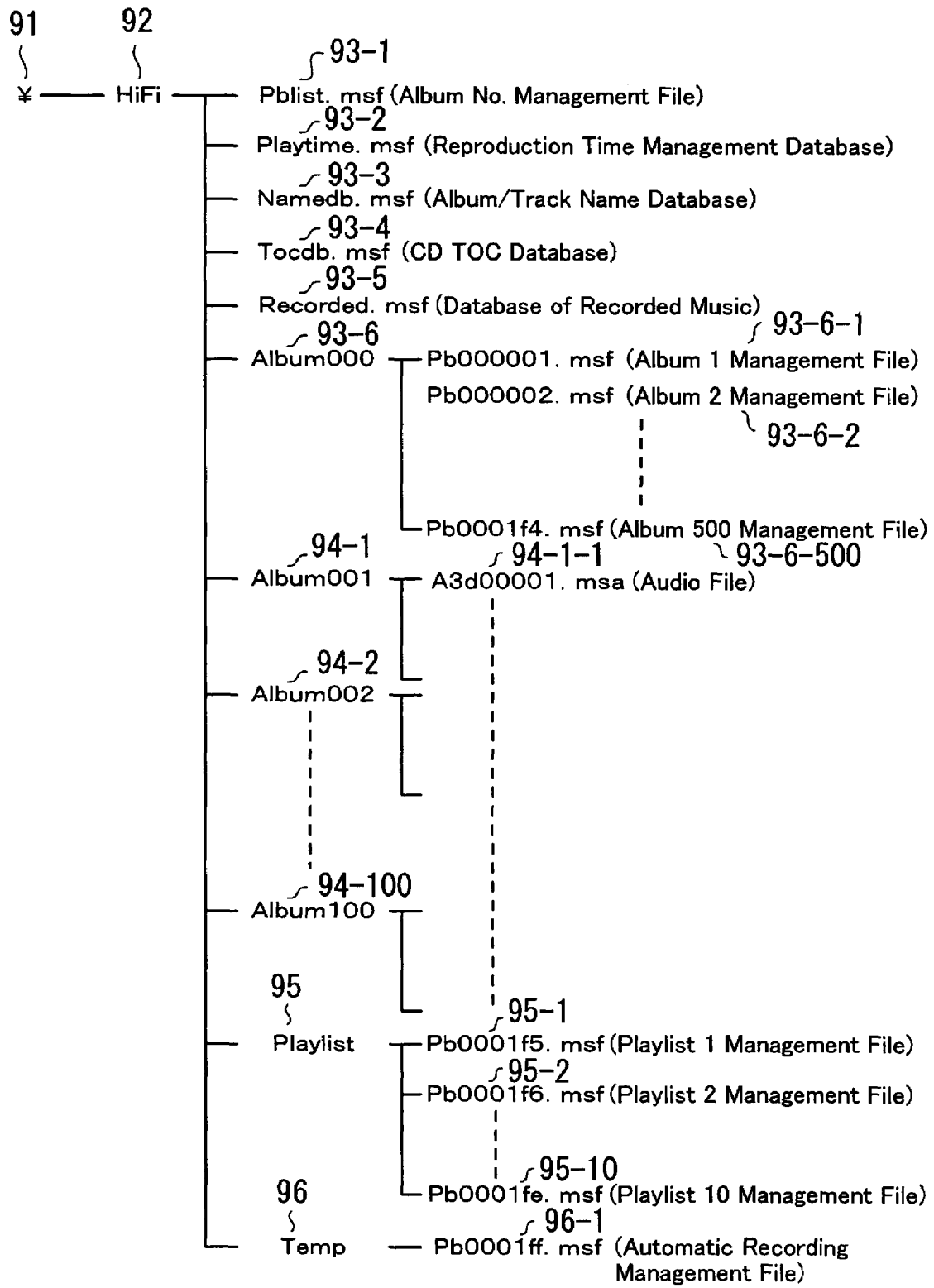
FIG. 9 is a diagram showing the structure of files retained in HDD.

FIG. 9 is a schematic diagram showing how the audio files recorded in the HD recording and reproducing unit 43 as well as databases managing the audio files are seen from the file system 88. The audio files and database files managing the audio files are arranged further below a directory called HiFi 92 under a root directory ¥91. Below the directory HiFi 92 is stored a 16 kb file called an album-playback list Pblist. msf 93-1 (album number management file) for indicating reproduction order of 500 albums. In the Pblist. msf 93-1 are described file numbers of reproduction management files for the respective 500 albums.

The same directory of HiFi 92 includes the following databases other than Pblist. msf 93-1. Those are a database Namedb. msf 93-3 (album/track name database) of album name, track name, and artist name of all albums and tracks, a database Playtime. msf 93-2 (reproduction time management database) of reproduction time of all tracks, and a database Tocdb. msf 93-4 (CD TOC database) for gathering TOC of CD when making a synchronous recording with the CD reproducing unit and then utilizing a service such as CDDB (CD Data Base) later so that a name can be added to each album and each track.

The final database file is Recorded. msf 93-5 (database of already-recorded audio data file). This database Recorded. msf 93-5 forms a pair with Tocdb. msf 93-4 for deciding whether or not each track included in CD's TOC data within Tocdb. msf 93-4 is already recorded and for estimating in which album that track is included.

A directory Album000 93-6 below the directory HiFi 92 contains playback lists of Pb000001. msf 93-6-1 (album 1 management file), Pb000002. msf 93-6-2 (album 2 management file), to Pb0001f4. msf 93-6-500 (album 500 management file), each of which stores data on the total number of tracks, names of albums, reproduction order of audio data files, album-highlights and so on which are included in 500 albums respectively.

One hundred directories of Album001 94-1 to Album100 94-100 below the directory HiFi 92 store already-recorded audio files. Because the audio files are capable of forming twenty thousand pieces of music at its maximum, if all those audio files are put in the same directory, plenty of time will be required for the file system 88 shown in FIG. 8 to retrieve the place of file. In order to reduce the time, it is efficient to disperse the audio files for storing. For this reason, the recorded audio files are stored in one hundred dispersed directories of Album001 94-1 to Album100 94-100. AS shown with A3d00001. msa 94-1-1, a file name of audio files is A3dxxxxx. msa and serial numbers are assigned up to the maximum $20000^{th}$ track.

A directory Playlist 95 below the directory HiFi 92 stores the following reproduction management files dedicated to Playlist for realizing the above-described playlist function. They are Pb0001f5. msf 95-1 (playlist 1 management file), Pb0001f6. msf 95-2 (playlist 2 management file), to Pb0001fe. msf 95-10 (playlist 10 management file).

Finally, a directory Temp 96 below the directory HiFi 92 stores an automatic recording management file Pb0001ff. msf 96-1 for realizing an automatic recording function according to the present embodiment.

FIG. 10 shows the album playback list Pblist. msf explained referring to FIG. 9. In FIG. 10, BLKID-TLO 101 is a fixed character array written as "TL-O". REVISION 102 indicates the number of times that Pblist. msf is rewritten. T-ALB 103 indicates the total number of albums contained in the HD recording and reproducing unit. Note that the total number of albums includes the play list and so T-ALB 103 is 512 for the dubbing system according to this embodiment in which the CD reproducing unit is integrated with the HD recording and reproducing unit. Alb-001 to Alb-500 indicate a file number 104 of each album management file of Pb000001. msf 93-6-1 (album 1 management file), Pb000002. msf 93-6-2 (album 2 management file) to Pb0001f4. msf 93-6-500 (album 500 management file). Reproduction order of album is order of Alb-xxx of the album playback list. msf.

FIG. 11 shows Pbxxxxxx. msf of the playback list (each album reproduction management file) explained referring to FIG. 9. BLKID-TLO 111-1 is a fixed character array written as "TL-O" and is a value for identifying the front of each reproduction management file. Mcode 111-2 is a code for identifying a maker model of recording equipment. REVISION 111-3 indicates the number of times of rewriting (renewing) Pbxxxxxx. msf. SN1C+L 112-1 is a graphic character code and a language code which are written in an area for one byte character array storing title of album. SN2C+L 112-2 is a graphic character code and a language code which are written in an area for two byte character array storing title of album.

SINFSIZE 112-3 indicates a total size of all data of additional data written in INF-S 116 area described later on. T-TRK 112-4 indicates the total number of tracks included in album. NM1-S (256) 113 is an area storing an album name of one byte character array. NM2-S (512) 114 is an area storing an album name of two byte character array. TRK-xxx from TRK-001 to TRK-400 describes a file number 115 of TRK INF to be reproduced. INF-S(14720) 116 indicates album's additional data, into which additional data such as a name of artist can be written. S-YMDhms 117 is the date and time of recording. The track to be reproduced is reproduced in accordance with contents of Pbxxxxxx. msf and its order becomes as TRK-xxx indicates. Further, when new audio data is recorded, it is necessary to renew Pbxxxxxx. msf correctly.

Figure 12:
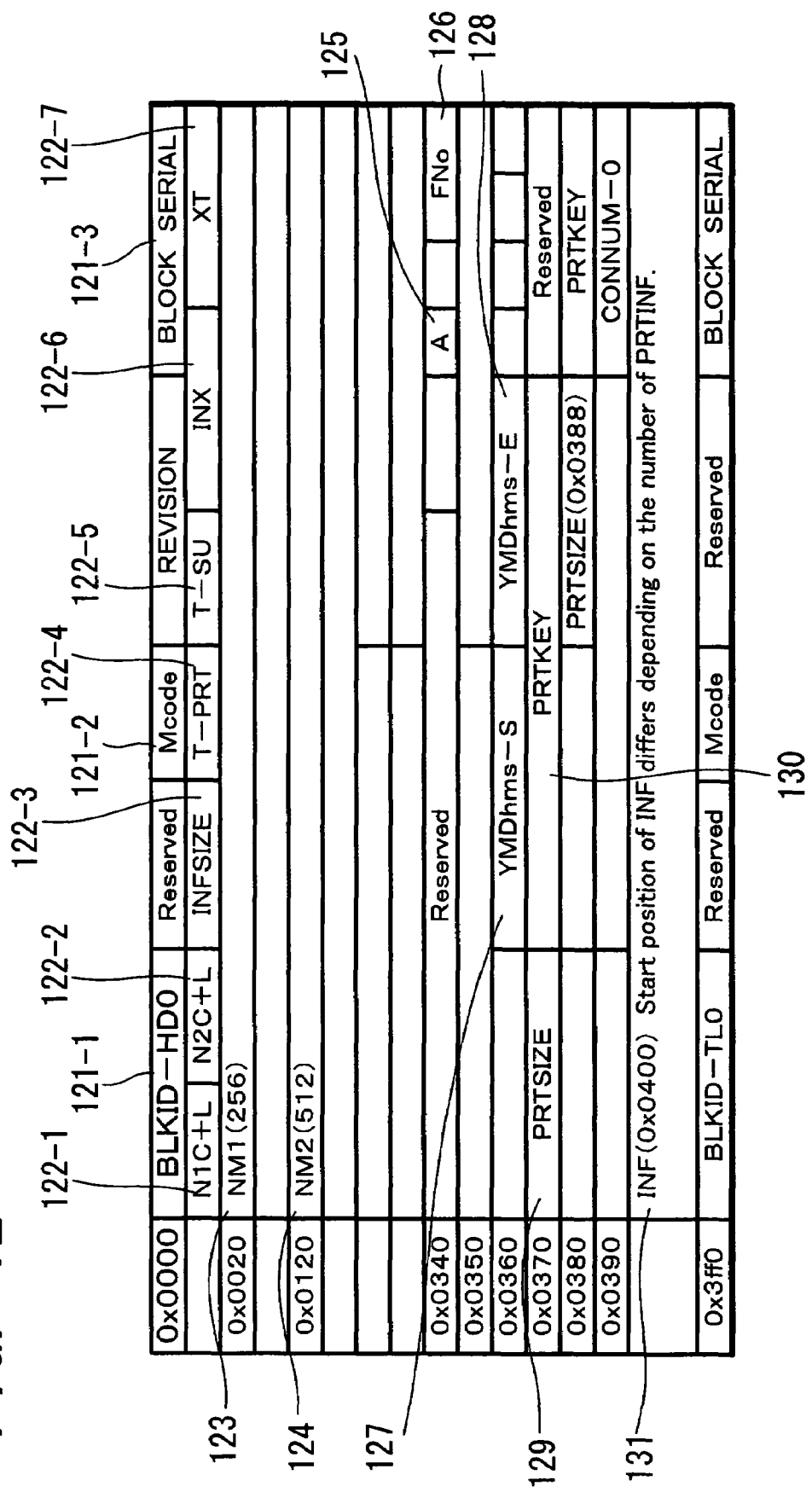
FIG. 12 is a diagram showing an A3D header (the first 16 Kb of A3dxxxxx. msa)

FIG. 12 shows an audio data information management area called A3D header attached to the first 16 kbyte section of A3xxxxx. msa which is the audio file explained referring to FIG. 9. BLKID-HDO 121-1 is a value for identifying the front of ATRAC3 data file, which is a fixed value of "HD-0". Mcode 121-2 is a code for identifying a maker model of recording equipment. BLOCK SERIAL 121-3 is a serial number attached to each block within a track. The head of blocks in each audio data file is numbered from zero and the number increases one by one as the block goes to the next. Further, even though editing is carried out, the value remains unchanged. Audio data recorded in the HD recording and reproducing unit of the dubbing system according to the present embodiment in which CD reproducing unit is integrated with HD recording and reproducing unit is capable of being subjected to an edit of dividing audio data file, combining audio data file, and so on. N1C+L 122-1 represents an attribute of track data NM1 123 described later on. N2C+L 122-2 represents an attribute of track data NM2 124 described later on.

INFSIZE 122-3 represents a total size of all data on functions and additional data written in tracks. ATRAC3 data file is written into HDD as data in 16 kbyte (one cluster) unit. One cluster consists of a plurality of sound units and audio data file need not begin with the first sound unit within one cluster. Therefore, it is optional with which sound unit in a cluster audio data file begins and with which sound unit it ends. Moreover, one track can retain a plurality of parts each of which is an aggregate of clusters and sound units. Thus, it is necessary to know a total number of parts constituting a track. T-PRT 122-4 indicates a total number of parts constituting a track. T-SU 122-5 represents an actual total number of sound units within a track. INX 122-6 is a pointer indicating the head of an impressive portion called sabi in audio data file. By using this pointer, it is possible to find easily the impressive portion in tracks. The dubbing system according to the present embodiment in which CD reproducing unit is integrated with HD recording and reproducing unit has a highlight-scan-reproducing function of playing only the impressive portion of each track. XT 122-7 represents the number of sound units included in a time to be reproduced from the head pointed by INX 122-6.

NM1 (256) 123 represents a title of a track storing one byte of graphic character code. NM2 (512) 124 represents a title of a track storing two bytes of graphic character code. A 125 is an attribute of track and indicates a compression mode of ATRAC3. Fno 126 is a file number and corresponds to xxxxx portion of the A3xxxxx. msa. YMDhms-S 127 represents the date of starting reproduction. YMDhms-E 128 represents the date of ending reproduction. PRTSIZE 129 represents the size of the parts. PRTKEY 130 is a value for encrypting the parts. INF 131 indicates additional data on track and is capable of storing data on a name of artist of track and the like.

Using Pblist. msf, Pbxxxxxx. msf and A3xxxxx. msa described with reference to FIG. 10, FIG. 11 and FIG. 12, it is possible to acquire reproduction order of album 1 to 500, recordable tracks, a name of each album, a name of each track, an artist name of each album and track, total playing time of each album, and playing time of each track. On the other hand, it is necessary for acquiring actually those pieces of data to open and read files stored in HDD one by one, so that it is impossible to obtain a comfortable system operating environment. Thus, Namedb. msf 93-3 and Playtime. msf 93-2 are formed below the directory HiFi 92 in FIG. 9 so as to make the above-described data into a database and to allow desired data to be acquired promptly.

FIG. 13 shows details of Namedb. msf described with reference to FIG. 9. In order to quickly retrieve names (album name, audio data file name, and artist name) registered in name fields NM1, NM2 and additional data INF (artist name) of files of Pblist. msf, Pbxxxxxx. msf, and A3xxxxx. msa, a file in which only names are recorded is formed. A name of the file is Namedb. msf and its file format includes nine album name blocks and 323 audio-data-file name blocks (16 kbytes per block). The block format includes a BLK record having a fixed length of 8 bytes and sixty-two name records having a fixed length of 264 bytes. 1 BLK record and 62 name records form 1 block (16 kbytes). The block is classified into an album name block 131 and an audio-data-file name block 132. The album name block 131 has 1 to 500 records and is capable of making 558 records at its maximum, but data is made to be valid up to 510 records and invalid after that(0x00: fixed).

Figure 14:
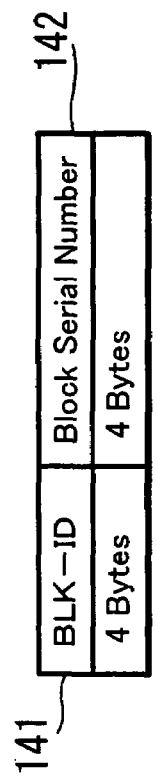
FIG. 14 is a diagram showing a block-ID portion of Namedb. msf.
Figure 15:
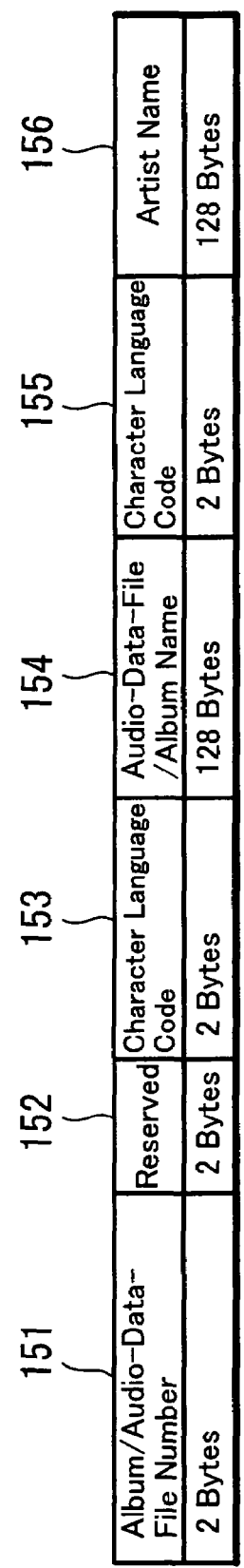
FIG. 15 is a diagram showing a name record portion of Namedb. msf.

The audio-data-file name block 132 has 1 to 20000 records and is capable of making 200026 records at its maximum, but data is made to be valid up to 20000 records and invalid after that (0x00: fixed). The file size is 332 blocks× 16384=5439488 bytes (5312 kbytes). As shown in FIG. 14, a block ID portion of BLK record includes BLK-ID 141 of 4 bytes and block serial number 142 of 4 bytes, the former being a fixed character array of "ANMO" 133 for the album name block 131 and a fixed character array "TNMO" 135 for the audio-data-file name block 132. The block serial number is consecutive numbers from one. As shown in FIG. 15, the name record portion includes album/audio-data-file number 151 of 2 bytes, reserved 152 of 2 bytes, character language code 153 of 2 bytes, audio-data-file/album name 154 of 128 bytes, character language code 155 of 2 bytes, artist name 156 of 128 bytes. The records are recorded in order of the album file number from 1 to 500 and in order of the audio-data-file number from 1 to 20000. Data whose album/audio-data-file number 151 is zero is made to be invalid.

FIG. 16 shows details of Playtime. msf described with reference to FIG. 9. In order that total playing time of each album can be found promptly, playing time of each audio data file is recorded. Moreover, an index and a track number TNO associated with TOC data within TOC database described later on are recorded. The file name is Playtime. msf. The file format consists of 15 blocks (16 kbytes per block). The block format consists of a BLK record of 8 byte fixed length, TRK records (1365 records) of 12 byte fixed length, and a reserved record of 4 byte fixed length (0x00: fixed). 1 BLK record 161, 1365 TRK records 162, and 1 reserved record 163 form 1 block (16 kbytes). TRK records are capable of making 20475 records, but data up to 20000 is made to be valid and data after that invalid (0x00: fixed).

The file size is 15 blocks×16384=245760 bytes (240 kbytes). As shown in FIG. 17, a block ID portion in the BLK record of the record format includes a BLK-ID 171 of 4 bytes and a block serial number 172 of 4 bytes. The BLK-ID 171 is made to be a fixed character array of "TRKO" 161 and the block serial number is made to be consecutive numbers from one. AS shown in FIG. 18, the TRK record portion includes audio-data-file number 181 of 2 bytes, album file number 182 of 2 bytes, audio-data-file total SU 183 of 4 bytes, TOCDB IDX 184 of 2 bytes, and TOC TNO 185 of 2 bytes. The records are recorded in order of the audio-data-file number from 1 to 20000. Data whose album file number 182 is zero is made to be invalid. Although the playlist is not provided with the album file number, total playing time in the playlist is calculated by finding the TRK record from reproduction order file number within PBnnnnnn.MSF (nnnnnn:0001F5 to 0001FE).

In the dubbing system according to the present embodiment in which CD reproducing unit is integrated with HD recording and reproducing unit, a synchronous recording from the CD reproducing unit as a reproduction origin to the HD recording and reproducing unit as a recorder origin is enabled. Before starting the synchronous recording, the HD recording and reproducing unit requests to send TOC data contained in a CD intended for reproduction from the CD reproducing unit. To require the data, there is a method, other than the system control signal C shown in FIG. 4, of inputting an audio signal conforming to IEC 60958 to a HD recording and reproducing unit, using the digital interface circuit of the HD recording and reproducing unit, and analyzing data included in user's bit (U) of the audio signal. It is arranged that, by preserving TOC data on CD as reproduction origin in a database file, when connecting later to a site capable of acquiring CD data on the internet such as CDDB, a name can be given to album/track recorded in the HD recording and reproducing unit.

The database file for performing such function is Tocdb. msf described with reference to FIG. 9.

FIG. 19 is a diagram showing details of Tocdb. msf described with reference to FIG. 9. In order that a personal computer (PC) is connected using the USB connector of audio input/output section 44 shown in FIG. 4 and an audio-data-file name can be determined on the personal computer (PC) side, a file which records TOC data capable of retrieving CDDB is formed. The file name is Tocdb. msf. The file format consists of 13 blocks (16 kbytes per block). The block format includes a BLK record 191 having an 8 byte fixed length, ALBUM TOC records 192-1 to 192-500 having a 412 byte fixed length (39 records), and a RESERVED record 193 having a 308 byte fixed length (0x00: fixed) One BLK record 191, thirty-nine ALBUM TOC records 192-1 to 192-39 and one RESERVED record 193 constitute one block (16 kbytes). The ALBUM TOC records 192-1 to 192-500 are capable of making 507 records at its maximum, but data up to 500 is made to be valid and data after that invalid (0x00: fixed ).

The file size is 13 blocks×16384=212992 bytes (208 kbytes). In the record format, a block ID portion of the BLK record includes, as shown in FIG. 20, BLK-ID 201 of 4 bytes, block serial number 202 of 4 bytes, and the number of album 203 of 4 bytes. The BLK-ID 201 is made to be a fixed character array of "TOCO" and the block serial number 202 is made to be consecutive numbers from one. The number of album 203 corresponds to ALBUM TOC record 192-1 to 192-500. The ALBUM TOC record portion includes, as shown in FIG. 21, TOC DB IDX 211 of 2 bytes, state of use 212 of 2 bytes, and TOC data 213-1 to 213-103 of 4 bytes each. The TOC data 213-1 to 213-103 includes, as shown fully in FIG. 22, TrK No. 221 of one byte, AMIN 222 of one byte, ASEC 223 of one byte, and AFRAME 224 of one byte. The ALBUM TOC record of Tocdb. msf is mutually related with Playtime. msf. From track data on Playtime. msf, it is possible to know which TNO of TOC within Tocdb. msf the track corresponds to. Thus, it is arranged that, even though editing, deletion and the like of audio file is performed, a correct name of audio data file can be obtained from CDDB.

FIG. 23 is a diagram showing details of Recorded. msf shown in FIG. 9. This file is for estimating whether a CD desired to be recorded is already recorded or not, and for examining, when a number of tracks have already been recorded, in which album the track is recorded. The file name is Recorded. msf. The file format consists of 4 blocks (16 kbytes per block). The block format includes BLK record 231 of a 8 byte fixed length, TOC RECORDED records 232-1 to 232-500 of a 107 byte fixed length (153 records), and RESERVED record 233. 1 BLK record, 153 TOC RECORDED records and 1 RESERVED record constitute 1 block (16 kbytes). TOC RECORDED records 232-1 to 232-500 are capable of making 612 records at its maximum, but data up to 500 is made to be valid and data after that invalid (0x00: fixed).

Figures 24, 25, 26, 27:
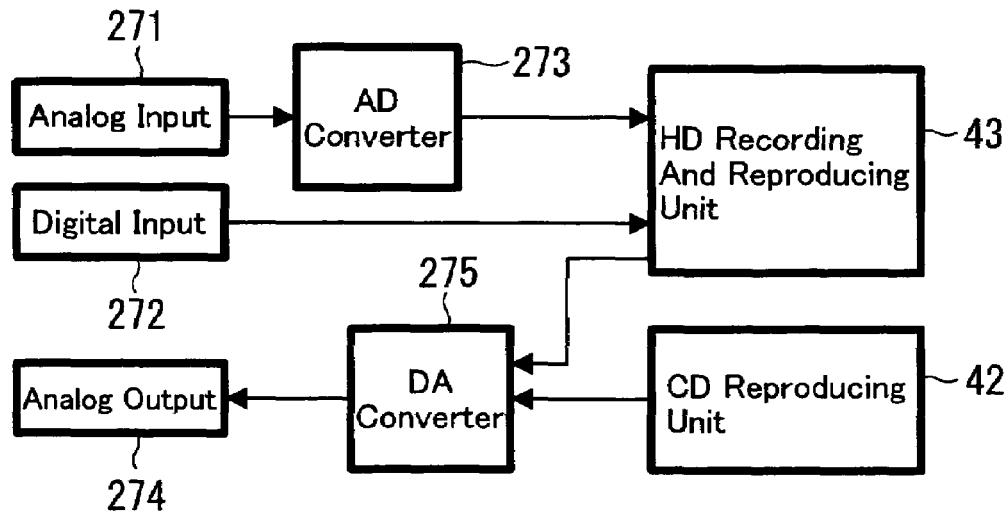
FIG. 24 is a diagram showing a block-ID portion of Recorded. msf.
FIG. 25 is a diagram showing TOC RECORDED record of Recorded. msf.
FIG. 26 is a diagram showing RECORDED flag of Recorded. msf.
FIG. 27 is a diagram showing details of an audio input/output section.

The file size is 4 blocks×16384=65536 bytes (64 kbytes). A block ID portion of the BLK record in the record format includes, as shown in FIG. 24, BLK-ID 241 of 4 bytes, block serial number 242 of 4 bytes, and the number of album 243 of 4 bytes. The BLK-ID 241 is made to be a fixed character array of "RECO" and the number of album is made to be consecutive numbers from one. The number of album corresponds to TOC RECORDED records 232-1 to 232-500. The TOC RECORDED record portion includes, as shown in FIG. 25, RECORDED DB IDX 251 of 2 bytes, TOC DB IDX 252 of 2 bytes, album number 253 of 2 bytes, and RECORDED flag 254 of 101 bytes. The RECORDED flag 254 includes, as shown in FIG. 26, FTNO 261 of 1 byte, LTNO 262 of 1 byte, Tr1 263-1 to Tr99 263-99 of 1 byte each.

The RECORDED. msf is related with the Tocdb. msf, which makes it possible to examine an index number corresponding to TOC described in Tocdb. msf and where the CD is recorded. Moreover, because the RECORDED flag indicates as to whether each track corresponding to TOC data has already been recorded or not, it is possible to distinguish recorded tracks from non-recorded ones at the final stage of automatic recording process according to the present embodiment and record only the non-recorded tracks.

As described above, the HD recording and reproducing unit according to the present embodiment is capable of making an edit operation. Examples of the edit operation are divide of audio data file, combine of audio data file, erase of album, move of audio data file, move of album, add of album name, add of artist name in album, add of track name, and add of artist name on track. The database excluding Tocdb. msf must always be renewed after each edit operation and thus must be managed so that no difference may arise between the actual condition and database at all times.

FIG. 27 is a diagram for explaining the audio input/output section 44 shown in FIG. 4. Into the dubbing system according to the present embodiment in which CD reproducing unit is integrated with HD recording and reproducing unit are inputted two kinds of audio signals. One is an analog input 271 and the other is a digital input 272. An audio signal input from the analog input 271 is supplied to an AD (analog/digital) converter 273. The audio signal input to the AD converter 273 is converted into a serial signal synchronized with LR clock and bit clock, and then is supplied to a digital interface 81 in the HD recording and reproducing unit 43. The audio signal supplied to the HD recording and reproducing unit 43 is output from an analog output 274 through a DA (digital/analog) converter 275 described later on as a monitor output when the HD recording and reproducing unit 43 is in a recording state. An audio signal output inversely from the CD reproducing unit 42 or HD recording and reproducing unit 43 is supplied to the DA converter 275. The DA converter 275 DA-converts input audio data of IEC 60958 format and outputs the converted audio data to the analog output 274. Furthermore, the DA converter 275 not only outputs audio data but also mutes audio data if it receives such instructions from the CD reproducing unit 42 or HD recording and reproducing unit 43.

Next, the present embodiment will be described along user's actual operation procedure.

Examples of specific operation will be described below.

A first operation example is one in which a CD has been reproduced from beginning to end without any interruption to operation on the way. Since all tracks are recorded for the first time, all tracks are moved from a temporary storage area to a permanent storage area that is an ordinary album.

A second operation example is one in which when a CD containing 10 tracks is reproduced, a user forwards audio data file at the 3rd track, selects the 8th track and has listened to the CD to the end. In this case, although all tracks of this CD are music not yet recorded, because only tracks 1, 2, 8, 9 and 10 are recorded completely, only those tracks are moved from the temporary storage area to the permanent storage area that is the ordinary album.

A third operation example is one in which a CD containing 10 tracks has been reproduced from beginning to end without any interruption to operation on the way. Because the recorded tracks include already recorded ones, only tracks not yet recorded are moved from the temporary storage area to the permanent storage area.

A fourth operation example is one in which when a CD containing 10 tracks is reproduced, a user forwards audio data file on the way of track 2, resumes reproducing from track 4, forwards fast from a certain portion of different track 7, stops the fast forwarding on the way of track 9, and listens the CD to the end as it is. Because the recorded tracks includes already recorded ones, only tracks not yet recorded are moved from the temporary storage area to the permanent storage area that is the ordinary album.

A specific case of the first operation example will be described.

Figure 28:
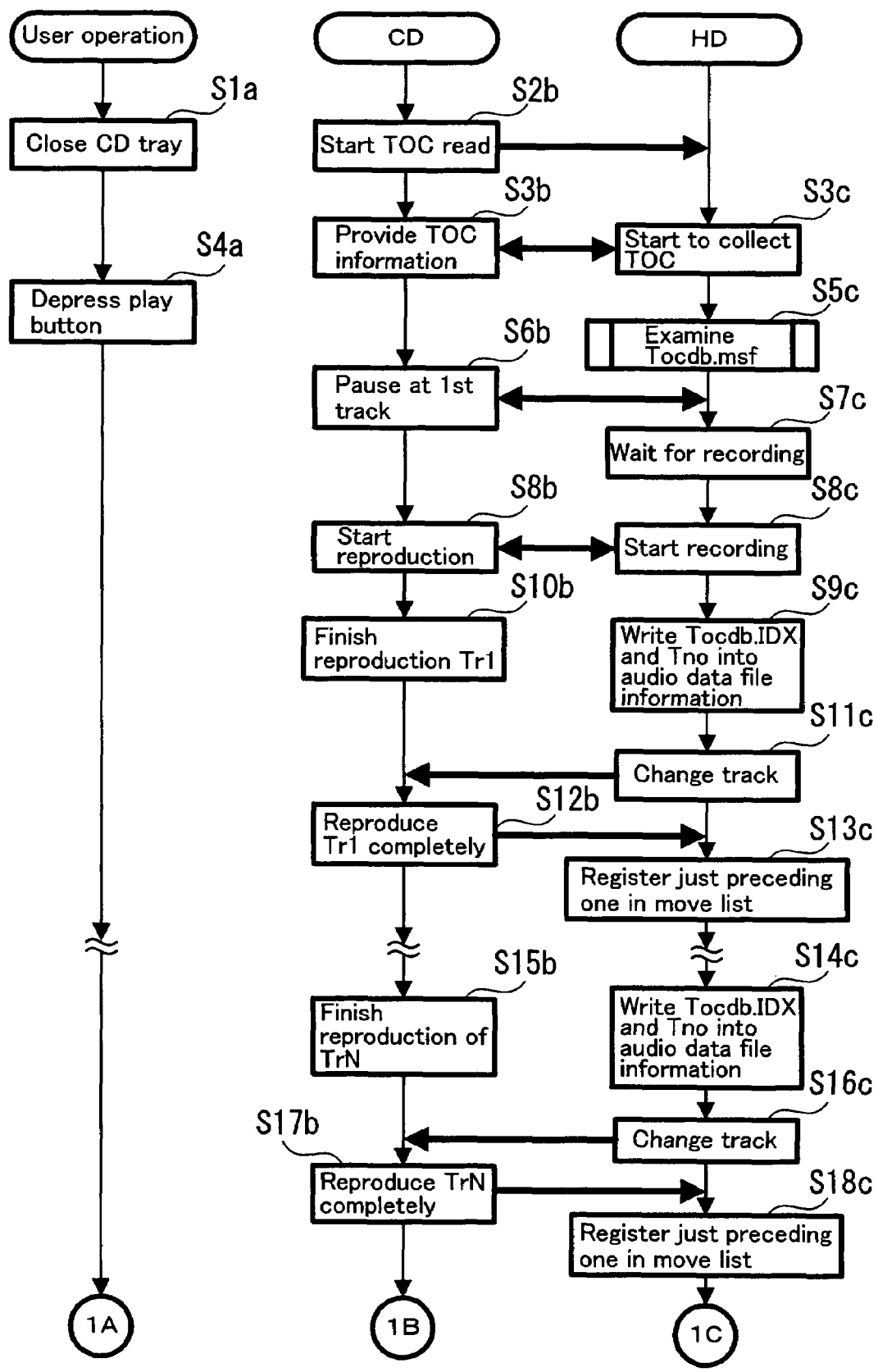
FIG. 28 is a flowchart showing processing when a user listens from beginning to end a CD on which not all audio data files have been recorded.
Figure 29:
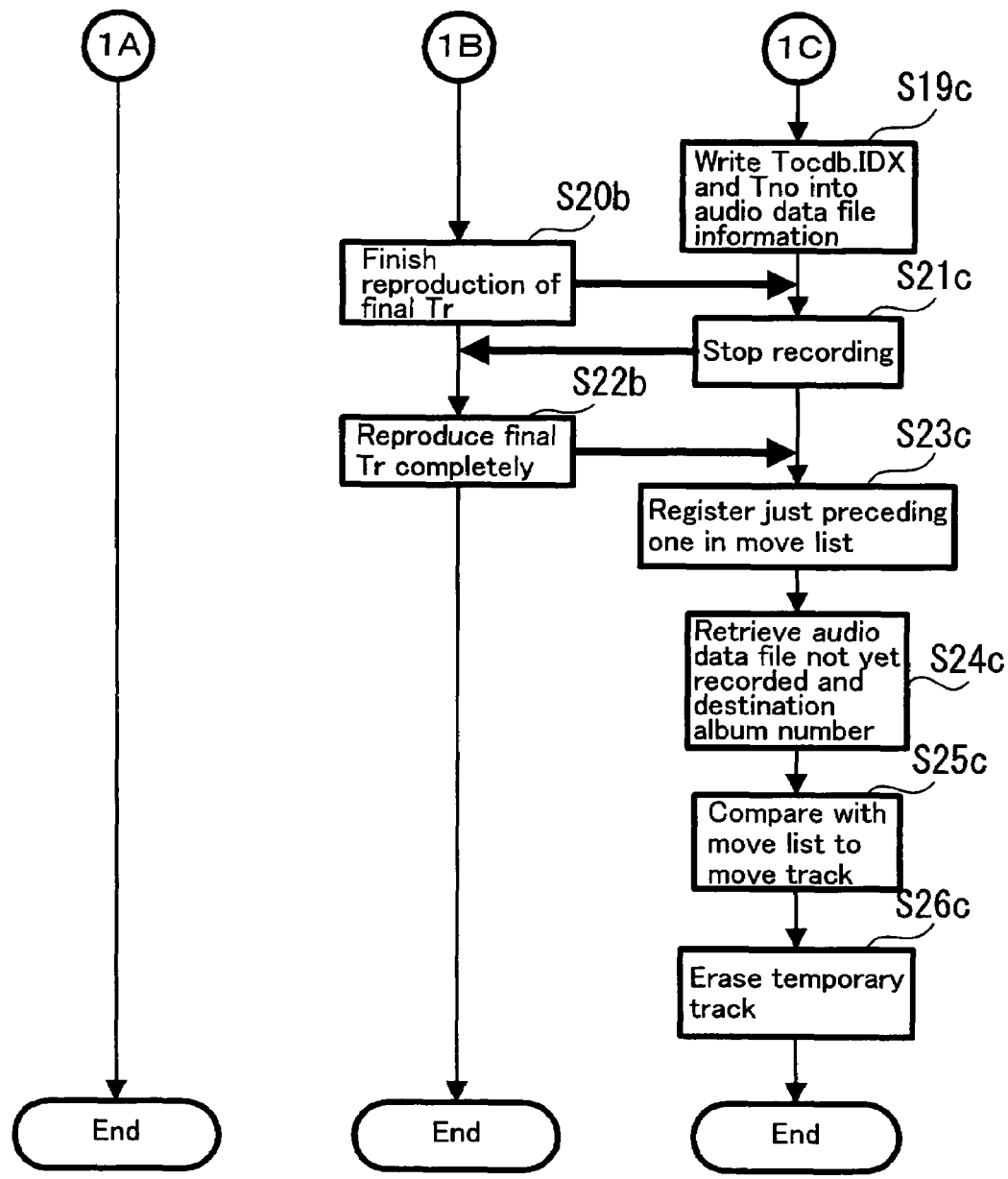
FIG. 29 is the following flowchart showing the subsequent processing when a user listens from beginning to end a CD on which not all audio data files have been recorded.

FIGS. 28 and 29 are diagrams forming a flowchart showing processing in the case where a user has listened to a CD whose all audio data files are not yet recorded from beginning to end. To begin with, when a user puts a CD on a tray at step S1a and the CD play unit starts TOC READ to read TOC at step S2b, the HD recording and reproducing unit collects TOC data of the CD at step S3c. At this moment, the CD reproducing unit provides the TOC data in response to TOC request from the HD recording and reproducing unit at step S3b. At step S5c, the HD recording and reproducing unit examines as to whether the collected TOC data has already been recorded in Tocdb. msf or not. If the TOC data collected by the HD recording and reproducing unit at step S5c proves by examination to already exist in Tocdb. msf, the HD recording and reproducing unit acquires TOC DB index of Tocdb. msf and if not, it adds new record(s) to Tocdb. msf and then acquires the TOC DB index.

When the user depresses a play button at step S4a, the CD reproducing unit is turned into a pause state, that is, temporarily stops at the head of the first track at step S6b. At step S7c, the HD recording and reproducing unit waits for recording. At step S8b, when the CD reproducing unit confirms that the HD recording and reproducing unit has turned into the waiting state for recording, it starts reproduction. In synchronism with this, the HD recording and reproducing unit starts recording at step S8c. At step S9c, the HD recording and reproducing unit begins recording to see the track number TNO of subcode Q input from the digital interface and records how many tracks of CD have been recorded before the track being recorded at present as well as the index number of Tocdb. msf opened at present into Playtime. msf.

At step S10b, the CD reproducing unit confirms that the user made no operation during the reproducing of Tr1 and waits for the end of reproduction of Tr1 until the HD recording and reproducing unit originates a track change. At step S11c, the HD recording and reproducing unit performs the track change by subcode Q and notifies the occurrence of track change to the CD reproducing unit. At step S12b, the CD reproducing unit having received the track change from the HD recording and reproducing unit notifies to the HD recording and reproducing unit that, because Tr1 which is recorded a little while ago has been recorded normally, the track may be moved from the temporary storage area to the permanent storage area that is the ordinary album, if necessary after completion of recording. At step S13c, the HD recording and reproducing unit notified by the CD reproducing unit stores data that the track which is recorded immediately before is a track which is an object of moving to the permanent storage area that is the ordinary album.

Similarly, the HD recording and reproducing unit begins recording, at step S14c, to see the track number TNO of TrN of subcode Q input from the digital interface and records how many tracks of CD have been recorded before the track being recorded at present as well as the index number of Tocdb. msf opened at present into Playtime. msf.

At step S15b, the CD reproducing unit confirms that user made no operation during the reproduction of TrN and waits for the end of reproduction of TrN until the HD recording and reproducing unit originates a track change. At step S16c, the HD recording and reproducing unit performs the track change based on subcode Q and then notifies the occurrence of track change to the CD reproducing unit. At step S17b, the CD reproducing unit having received the track change from the HD recording and reproducing unit notifies to the HD recording and reproducing unit that, because TrN recorded a little while ago has been recorded normally, the track may be moved from the temporary storage area to the permanent storage area that is the ordinary album, if necessary after the end of recording. At step S18c, the HD recording and reproducing unit notified from CD reproducing unit stores data that the track recorded immediately before is a track to be an object of moving to the permanent storage area that is the ordinary album. At step S19c, in the same way as before, the HD recording and reproducing unit records in Playtime. msf how many tracks have been recorded before the track presently recorded as well as the index number of Tocdb. msf opened at present. In this manner, whenever each track is recorded, the writing from Tocdb. msf into Playtime. msf and storing the track being an object to be moved are performed.

When the CD reproducing unit finishes reproduction of the final track at step S20b, the CD reproducing unit notifies that fact to the HD recording and reproducing unit. At step S21c, the HD recording and reproducing unit having received the notification from the CD reproducing unit stops recording. At step S22b, when the final track is one to be moved, the CD reproducing unit notifies that fact to the HD recording and reproducing unit. At step S23c, the HD recording and reproducing unit having received the notification from the CD reproducing unit stores data that the final track is one to be moved. At step S24c, the HD recording and reproducing unit retrieves records of Recorded. msf from TOC DB index number and examines a recorded state of an album destined to be moved (in case of the first time, a vacant album of the smallest number) and each track. At step S25c, the HD recording and reproducing unit compares the recorded state with a list of tracks to be moved, which was stored in recording, and moves the track which should really be moved to a predetermined album. Finally, tracks stored in the temporary storage area are erased at step S26c. After erasure, the HD recording and reproducing unit notifies the CD reproducing unit that processing has finished, and thus the processing comes to an end.

A specific case of the second operation example will be described.

Figure 30:
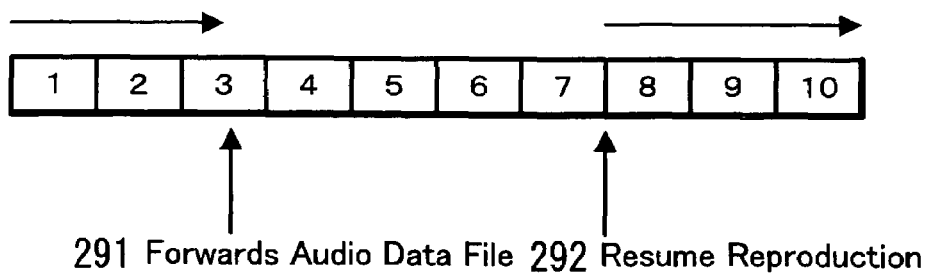
FIG. 30 is a diagram showing a track in case of specific example 2.

FIG. 30 is a diagram showing a track in case of the second operation example. In FIG. 30, reproduced tracks (1, 2, 8, 9, and 10) and user's operation (forwarding music 291, resuming reproduction 292) are represented. Track 3 is one in which user operates to forward audio data file 291 on the way. Tracks 1, 2 and tracks 8, 9, 10 after resuming reproduction 292 are reproduced completely.

Figure 31:
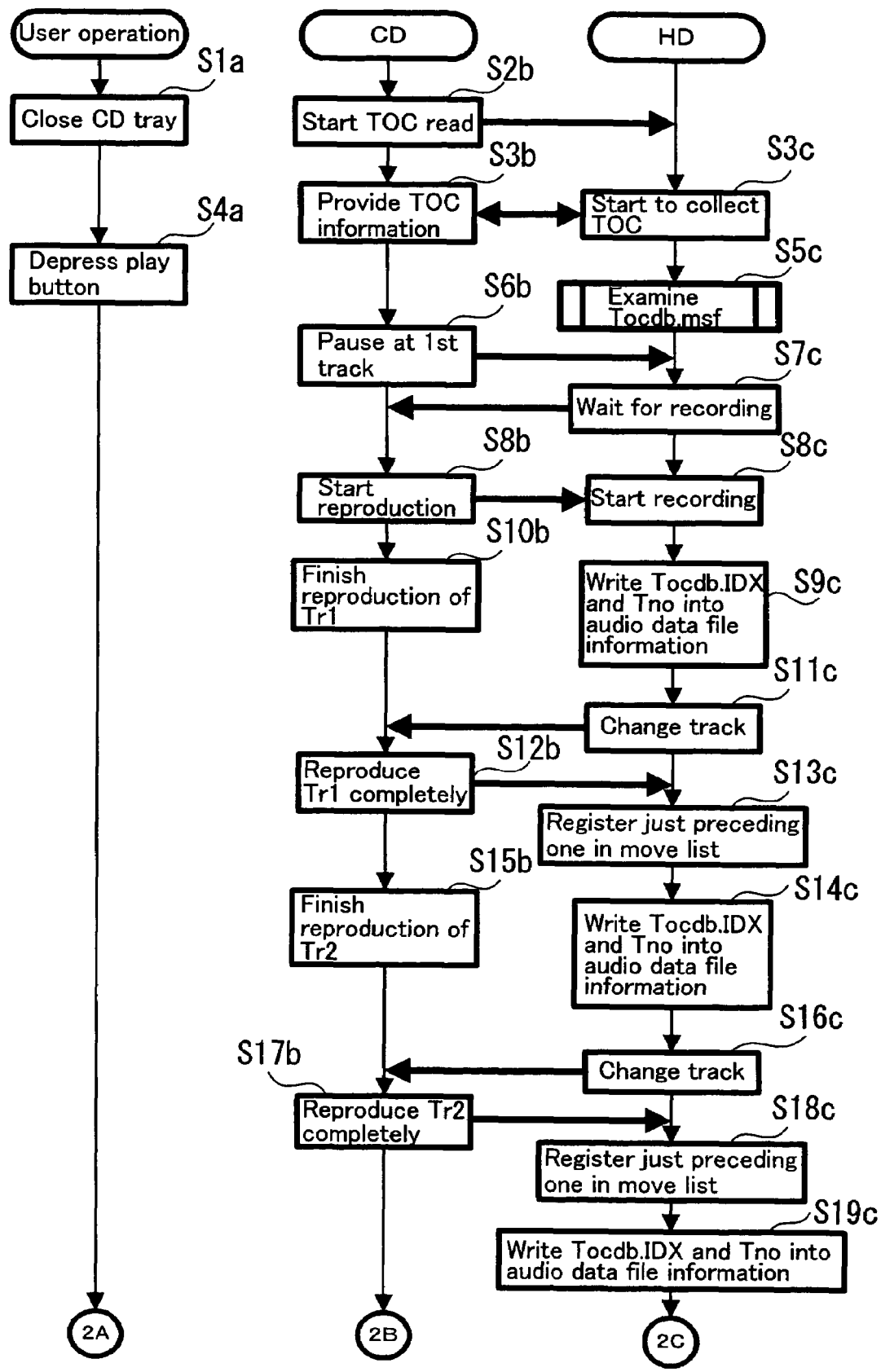
FIG. 31 is a flowchart showing processing when a user makes some operation in the middle of the processing.
Figure 32:
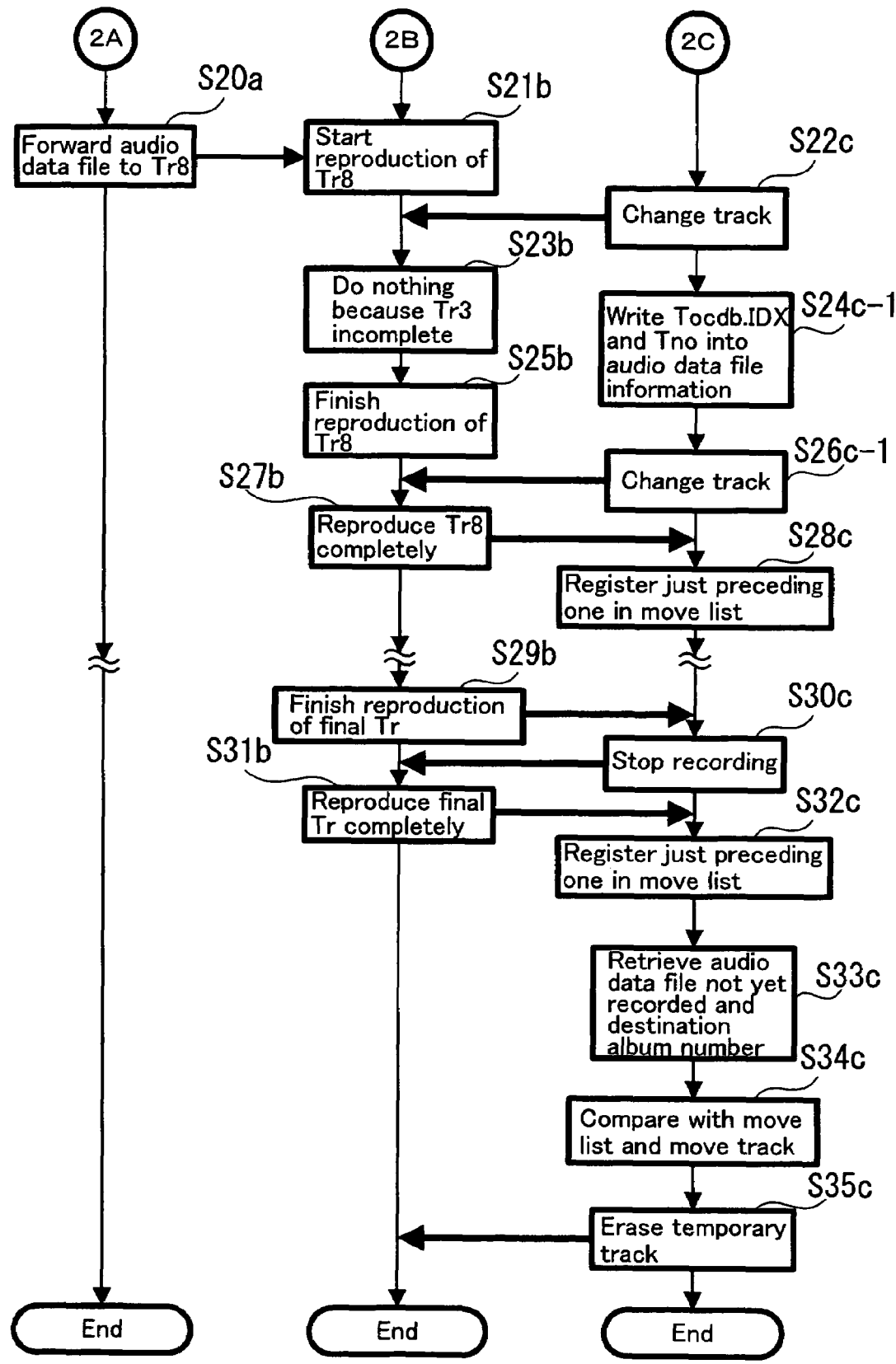
FIG. 32 is the following flowchart showing subsequent processing when a user makes some operation in the middle of the processing.

FIGS. 31 and 32 are diagrams of a flowchart showing processing in the case where user made some operation on the way. In FIGS. 31 and 32, processing corresponding to that in FIGS. 28 and 29 is denoted by the same symbols.

To begin with, when a user puts a CD on a tray at step S1a and the CD reproducing unit starts TOC READ to read TOC at step S2b, the HD recording and reproducing unit collects TOC data of CD at step S3c. At this moment, the CD reproducing unit provides the TOC data in response to TOC request from the HD recording and reproducing unit at step S3b. At step S5c, the HD recording and reproducing unit examines as to whether or not the collected TOC data has already been recorded in Tocdb. msf. If the collected TOC data proves to already exist in Tocdb. msf by examination of the HD recording and reproducing unit at step S5c, the HD recording and reproducing unit acquires TOC DB index of Tocdb. msf and if not, it adds new record(s) to Tocdb. msf and acquires TOC DB index.

When user depresses a play button at step S4a, the CD reproducing unit turns into a pause state to make a temporary stop at the head of the first track at step S6b. At step S7c, the HD recording and reproducing unit waits for recording. At step S8b, the CD reproducing unit confirms that the HD recording and reproducing unit waits for recording and then starts reproduction. Synchronously with this, the HD recording and reproducing unit starts recording at step S8c. At step S9c, the HD recording and reproducing unit starts recording to see the track number TNO of subcode Q input from the digital interface and records in Playtime. msf how many tracks have been recorded before the currently recorded track as well as the index number of Tocdb. msf currently opened.

At step S10b, the CD reproducing unit confirms that the user made no operation during the reproduction of Tr1 and waits for an end of the reproduction of Tr1 until the HD recording and reproducing unit originates a track change. At step S11c, the HD recording and reproducing unit performs the track change according to subcode Q and notifies to the CD reproducing unit that the track change has occurred. At step S12b, the CD reproducing unit having received the notification of track change from the HD recording and reproducing unit notifies the HD recording and reproducing unit that, because Tr1 recorded a little while ago has normally been recorded, track may be moved from the temporary storage area to the permanent storage area, that is, the ordinary album. At step S13c, the HD recording and reproducing unit having received the notification from the CD reproducing unit stores that the track recorded immediately before should be moved to the permanent storage area, that is, the ordinary album.

Similarly, at step S14c, the HD recording and reproducing unit starts recording to see the track number TNO of Tr2 of subcode Q input from the digital interface and records in Playtime. msf how many tracks have been recorded before the currently recorded track as well as the index number of Tocdb, msf currently opened.

At step S15b, the CD reproducing unit confirms that the user made no operation during the reproduction of Tr2 and waits for an end of the reproduction of Tr2 until the HD recording and reproducing unit originates a track change. At step S16c, the HD recording and reproducing unit performs the track change according to subcode Q and notifies the CD reproducing unit that the track change has occurred. At step S17b, the CD reproducing unit having received the notification of track change from the HD recording and reproducing unit notifies the HD recording and reproducing unit that, because Tr2 recorded a little while ago has been recorded completely, track may be moved from the temporary storage area to the permanent storage area, that is, the ordinary album, if necessary after the end of recording. At step S18c, the HD recording and reproducing unit having received the notification from the CD reproducing unit stores data that a track recorded immediately before should be moved to the permanent storage area, that is, the ordinary album. At step S19c, the same as before, the HD recording and reproducing unit records in Playtime. msf how many tracks have been recorded before the presently recorded track as well as the index number of Tocdb. msf presently opened.

In this way, whenever each track is recorded, the writing from Tocdb. msf into Playtime. msf and the storing a track to be moved are performed.

On this occasion, at step S20a, the user forwards audio data file to Tr8 while recording track 3 of CD. At step S21b, the CD reproducing unit starts reproduction of Tr8. At step S22c, the HD recording and reproducing unit reads subcode Q of the digital interface to detect the track change. At step S23b, because the CD reproducing unit has not reproduced completely the track 3 to the end, the CD reproducing unit does nothing toward the HD recording and reproducing unit so as not to add a track recorded a little while ago to the list of object to be moved.

At step S24c-1, the HD recording and reproducing unit starts recording to see the track number TNO of Tr3 of subcode Q input from the digital interface and records in Playtime. msf how many tracks have been recorded before the presently recorded track as well as the index number of Tocdb. msf opened at present. At step S25b, CD the reproducing unit finishes reproduction of track 8. At step S26c-1, the HD recording and reproducing unit performs the track change according to subcode Q. At step S27b, the CD reproducing unit notifies the HD recording and reproducing unit that, because the track 8 has been reproduced completely, the track 8 recorded a little while ago is one to be moved. At step S28c, the HD recording and reproducing unit having received the notification from the CD reproducing unit adds the track 8 recorded a little while ago to the track list of object to be moved. The same procedure will be performed with respect to track 9.

When the CD reproducing unit has finished reproduction of the final track at step S29b, the CD reproducing unit notifies the HD recording and reproducing unit that fact. At step S30c, the HD recording and reproducing unit having received the notification from the CD reproducing unit stops recording. At step S31b, the CD reproducing unit notifies the HD recording and reproducing unit that the final track is one to be moved. At step S32c, the HD recording and reproducing unit having received the notification from the CD reproducing unit stores data that the final track is one to be moved. At step S33c, the HD recording and reproducing unit retrieves records of Recorded. msf from TOC DB index number to examine a recorded state of the destination album and each track. At step S34c, the HD recording and reproducing unit compares the track list of object to be moved, which it has stored while recording, with the recorded state and moves the track to be really moved to the predetermined album. Finally, at step S35c, the track prepared in the temporary storage area is erased. After erasure, the HD recording and reproducing unit notifies the CD reproducing unit that processing has finished and processing comes to an end.

A Specific case of the third and the fourth operation examples will be described. The third operation example and fourth operation example are application examples of the above-described first operation example and second operation example. They differs only in that the first and second operation examples move all tracks included in tracks to be moved to the permanent storage area, that is, the ordinary album, whereas the third and fourth operation examples do not move all tracks included in tracks to be moved, namely, do not move tracks already recorded in Recorded. msf, so that the detailed flowchart is not described.

According to the above-described embodiments, the following advantageous results will be obtained. First, a user can automatically make the HD recording and reproducing unit store audio data only by listening CD.

Secondly, a user can handle the HD recording and reproducing unit just as a CD changer or a jukebox only by listening CD due to the above-described first advantage.

Thirdly, when automatically making the HD recording and reproducing unit store audio data as described in the first advantage, because of a function of specifying each individual CD, no disc space of the HD recording and reproducing unit will be consumed in vain.

Fourthly, because of the capability of not only specifying each individual CD but also distinguishing recorded tracks from unrecorded ones with respect to each track of CD, even if a user reproduces CD in any order, once all tracks of CD are normally reproduced, all tracks of CD can be recorded in the HD recording and reproducing unit.

Fifthly, by making use of the above-described second and third advantage as well as the track move which is an edit operation of audio data recorded in the HD recording and reproducing unit, even if CD is reproduced in any order, order of audio data file can be regulated automatically in accordance with the same audio-data-file number as in CD.

Sixthly, it is possible to analyze the subcode Q of digital data supplied from CD and to give the audio-data-file numbers corresponding with those of CD tracks. By making good use of this function, while recording audio data from CD to the HD recording and reproducing unit, it is possible to control the automatic recording from the CD reproducing unit to the HD recording and reproducing unit without synchronizing the CD reproducing unit with the HD recording and reproducing unit by the audio data file, and thus a time for development can greatly be saved.

Next, an operation where the CD reproducing unit stores playing order, playing time, and complete playing state and divides tracks recorded in the HD recording and reproducing unit at the end of processing will be described. A conventional track change using subcode must decide a track change point, so that such inconvenience has often occurred unavoidably that the decided time point does not correspond with TOC of CD and so on. In contrast, according to the present embodiment, it is possible to divide tracks at a correct time played by the CD reproducing unit. In this connection, the audio data file is divided using data from TOC data indicating how many milliseconds the reproducing has been made and cutting by the predetermined unit from the head. When the cut point of audio data file is detected using a crystal oscillator, the accuracy of detecting the cut point lowers because the operation of crystal oscillator is influenced by temperature. For this reason, when the cut point of track 1 is a1(sec), the cut point of track 2 being a2(sec), . . . and the cut point of track 10 being a10(sec), a correction is made using a correction coefficient A. In this case, as A×(a9/a10) . . . A×(a2/a10), A×(a1/a10), the correction is made in an inverse order from the final track 10 to the first track 1. In this case, only necessary portions are divided and unnecessary portions are collectively erased for raising the accuracy.

In the following, processing according to the present embodiment will be described by dividing into three kinds, namely, processing when the CD reproducing unit is reading TOC, processing while the CD reproducing unit starts reproduction and then stops the reproduction, and processing by the HD recording and reproducing unit after the CD reproducing unit has finished the reproduction.

Figure 33:
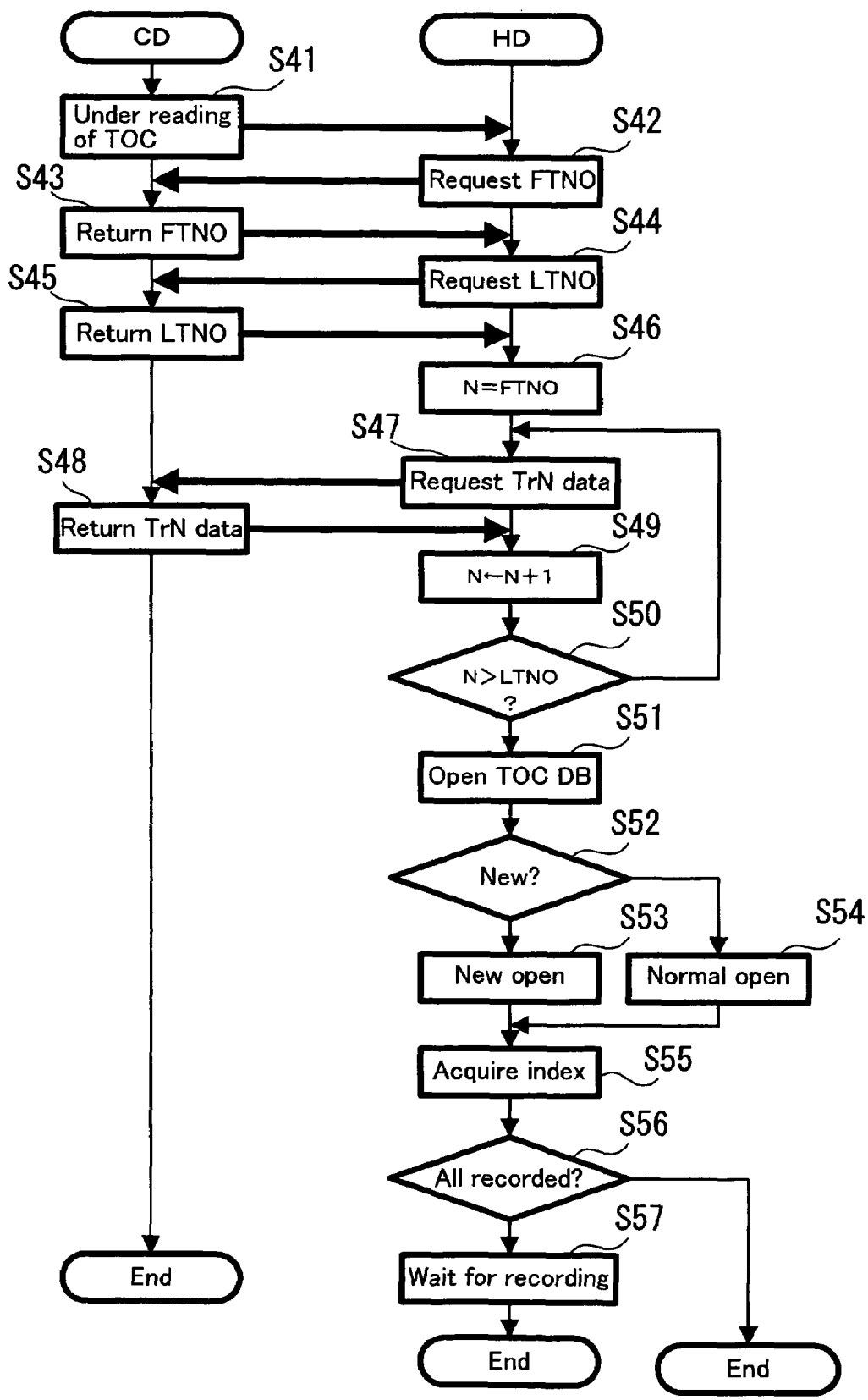
FIG. 33 is a flowchart showing processing when a CD reads out TOC.

FIG. 33 is a flowchart showing process when the CD reproducing unit reads TOC. FIG. 33 shows a state in which, when the CD reproducing unit reads TOC, the HD recording and reproducing unit attempts to acquire TOC from CD; further checks whether the TOC data already exists or not; and acquires an index of the TOC database.

When the CD reproducing unit is reading TOC at step S41, if the HD recording and reproducing unit receives a status signal of reading TOC from the CD reproducing unit, the HD recording and reproducing unit requests the first track number FTNO of CD at step S42. At step S43, the CD reproducing unit returns the first track number FTNO to the HD recording and reproducing unit. At step S44, the HD recording and reproducing unit requests the last track number LTNO of CD. At step S45, the CD reproducing unit returns the last track number LTNO to the HD recording and reproducing unit.

At step S46, the HD recording and reproducing unit sets a condition N=FTNO. At step S47, the HD recording and reproducing unit requests TrN data (AMIN, ASEC, AFRAME) of each track from the first track number FTNO to the last track number LTNO. At step S48, the CD reproducing unit returns the TrN data (AMIN, ASEC, AFRAME) of each track to the HD recording and reproducing unit. At step S49, the HD recording and reproducing unit increments a value of N. At step S50, the HD recording and reproducing unit estimates whether N>LTNO or not. When estimating that N<LTNO at step S50c, the HD recording and reproducing unit returns processing to step S47, and repeats the processing and estimation from step S47 to step S50. If N>LTNO at step S50, the HD recording and reproducing unit advances processing to step S51 and attempts to open TOC database (DB) corresponding to the acquired TOC data.

At step S52, the HD recording and reproducing unit estimates whether the TOC data just acquired is new one or not. When it already exists, the HD recording and reproducing unit sets a normal open at step S54; stores the index number of Tocdb. msf corresponding to the acquired TOC data; and stores a record of Recorded. msf corresponding to that index number at step S55. If data corresponding to the acquired TOC data do not exist yet, the HD recording and reproducing unit sets a new open to record a new record into Tocdb. msf and Recorded. msf at step S53, and acquires a new index number at step S55.

At step S56, in order to estimate whether the recording has all finished or not, the HD recording and reproducing unit checks whether each track of CD corresponding to the acquired TOC data has already been recorded all over with reference to a record of Recorded. msf corresponding to the index number.

If any track not yet recorded exists at step S56, the HD recording and reproducing unit waits for recording at step S57. If all tracks have been recorded, no processing will be activated any longer.

FIG. 34 is a locus table of reproduction showing a locus followed by the CD reproducing unit from starting reproduction to stopping the reproduction. The reproduction locus table in FIG. 34 consists of four data on a reproduction locus number PTNO 321, a reproduction track number TNO 322, a time of reproduction from beginning thereof AMSEC 323, and a complete reproduction status STS 324.

The reproduction locus number PTNO 321 is a number corresponding to the number of tracks which the CD reproducing unit recognizes as reproduced. The reproduction track number TNO 322 is a CD track number which is actually reproduced at that time. This reproduction track number TNO 322 does not always correspond with the reproduction locus number PTN 321. This is because a user is allowed to operate the audio-data-file forwarding, fast forwarding and the like. The time of reproduction from beginning thereof AMSEC 323 is a time from starting reproduction until the CD reproducing unit recognizes that reproduction of the next track has been started. Based on this time, audio data recorded in the HD recording and reproducing unit will be divided. The complete reproduction status STS 324 is a flag which is made to be OK when a track has been reproduced without user's operation to the end, or to be NG when the user's operation intervenes during reproduction to the end. FIG. 34 shows such example. This example shows a state in which a CD containing 16 tracks in total is reproduced while user's operation such as audio-data-file forwarding intervenes on the way and is stopped after the reproduction of 32 tracks has been made.

Figure 35:
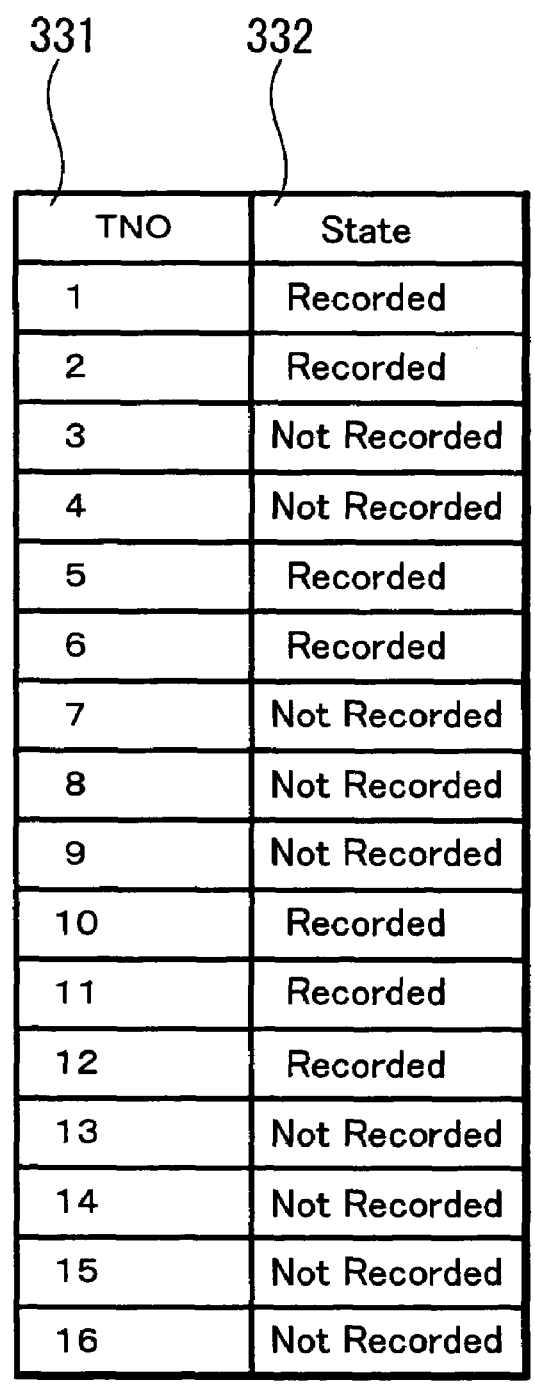
FIG. 35 is a diagram showing a recorded state of each track.

FIG. 35 shows a recorded state of each track. This is a schematic diagram showing a state 332 of whether the reproduction track number TNO 331 of each track described in records of Recorded. msf corresponding to the acquired index numbers shown in FIG. 33 is already recorded or not. In this example also, the same as the above-described example, tracks of the CD having 16 tracks in total have already been partially recorded.

Figure 36:
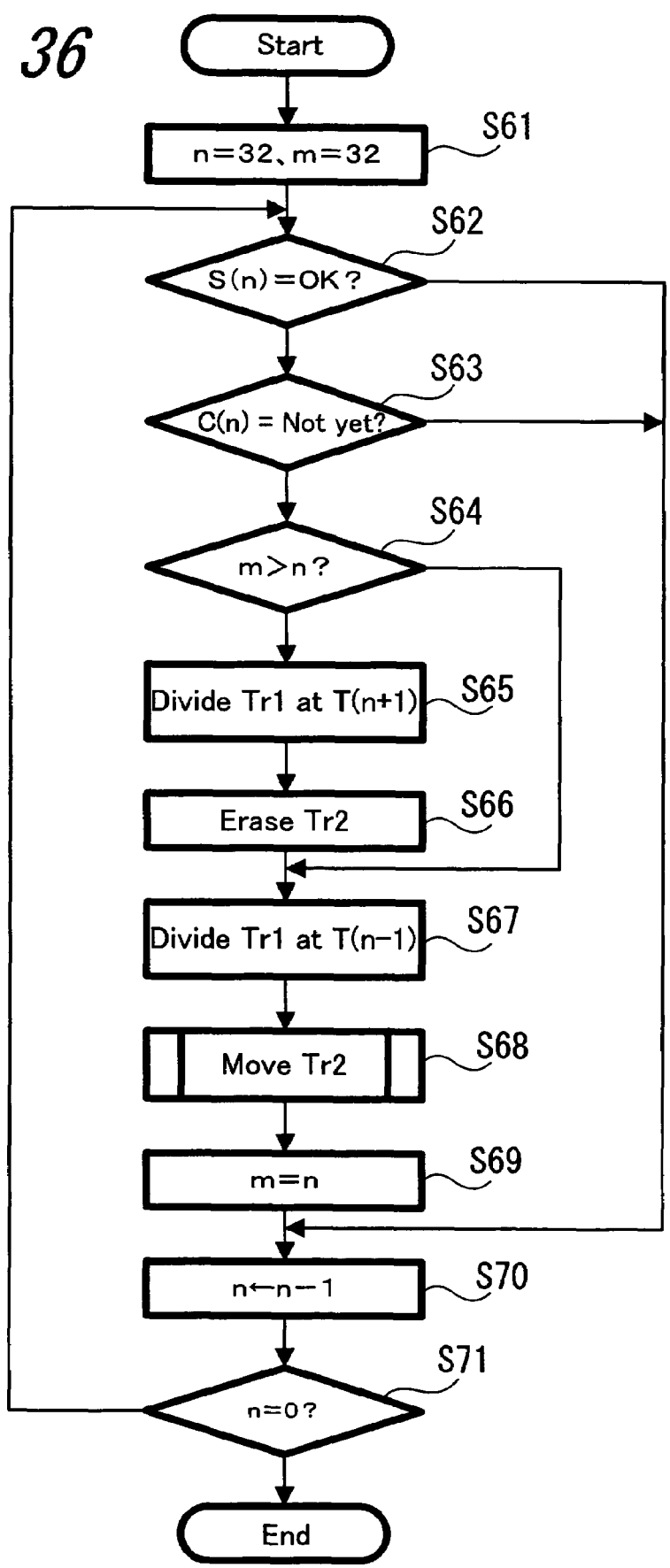
FIG. 36 is a flowchart showing processing of move operation.

FIG. 36 is a flowchart showing a move operation. This is a flowchart of estimating based on the data shown in FIGS. 34 and 35 whether an audio data track should be moved to the permanent storage area or not. In this figure, in order to simplify expressions in the flowchart, it is assumed that, when PTNO is n, $C(n)$ represents the n-th track number TNO; $T(n)$ represents the n-th reproducing time AMSEC (however, $T(O)$ represents the head of audio data file); and $S(n)$ represents the n-th status STS.

Each examination processing begins at the last PTNO of reproduction lotus data and continues to the first PTNO in turn. Now, n is assumed to be PTNO under examination.

To start with, it is set that n=32 and m=32 at step S61. At step S62, it is examined whether $S(n)$ is completely reproduced or not. If not completely reproduced at step S62, n is decreased by one at step S70 so as to examine the next PTNO. If completely reproduced at step S62, it is examined whether $C(n)$ has already recorded or not from Recorded. msf at step S63. If not recorded at step S63, n is decreased by one at step S70 so as to examine the next PTNO. If not recorded at step S63, processing to extract the track is carried out.

When processing is branched in case of NO at steps S62 and S63, no divide of tracks is performed. This is for reducing the number of times of divide to raise a processing speed.

When the track is extracted, garbage data forming NG may sometimes be attached to the rear of track. Accordingly, track Tr1 is once divided first at a time of $T(n+1)$ from the head of track at step S65. At step S66, track Tr2 which is garbage data resulting from divide is erased. Next, in order to extract a track desired to be taken out, track Tr1 is divided at a time of $T(n-1)$ from the head of track. This means that the track Tr2 as a track desired to be moved has been extracted.

Thus, the track Tr2 is moved to a destination album at step S68. The destination album can be found from Recorded. msf. However, when moving, the index number INDEX and TOC TNO of TOC database are written into a record of Playtime. msf corresponding to the file number of moving track. At a time point when the move has been completed, a mark of already recorded is attached to a record corresponding to the index number INDEX of Recorded. msf and both the databases are renewed. This processing will be confirmed with reference to a flowchart of track move described later on.

Next, a value of n is substituted for m and garbage data is recognized to be erased at step S69. At step S70, n is decreased by one. At step S71, processing returns to step S62 to repeat processing and estimation from step S62 to step S71 until n=O.

Figure 37:
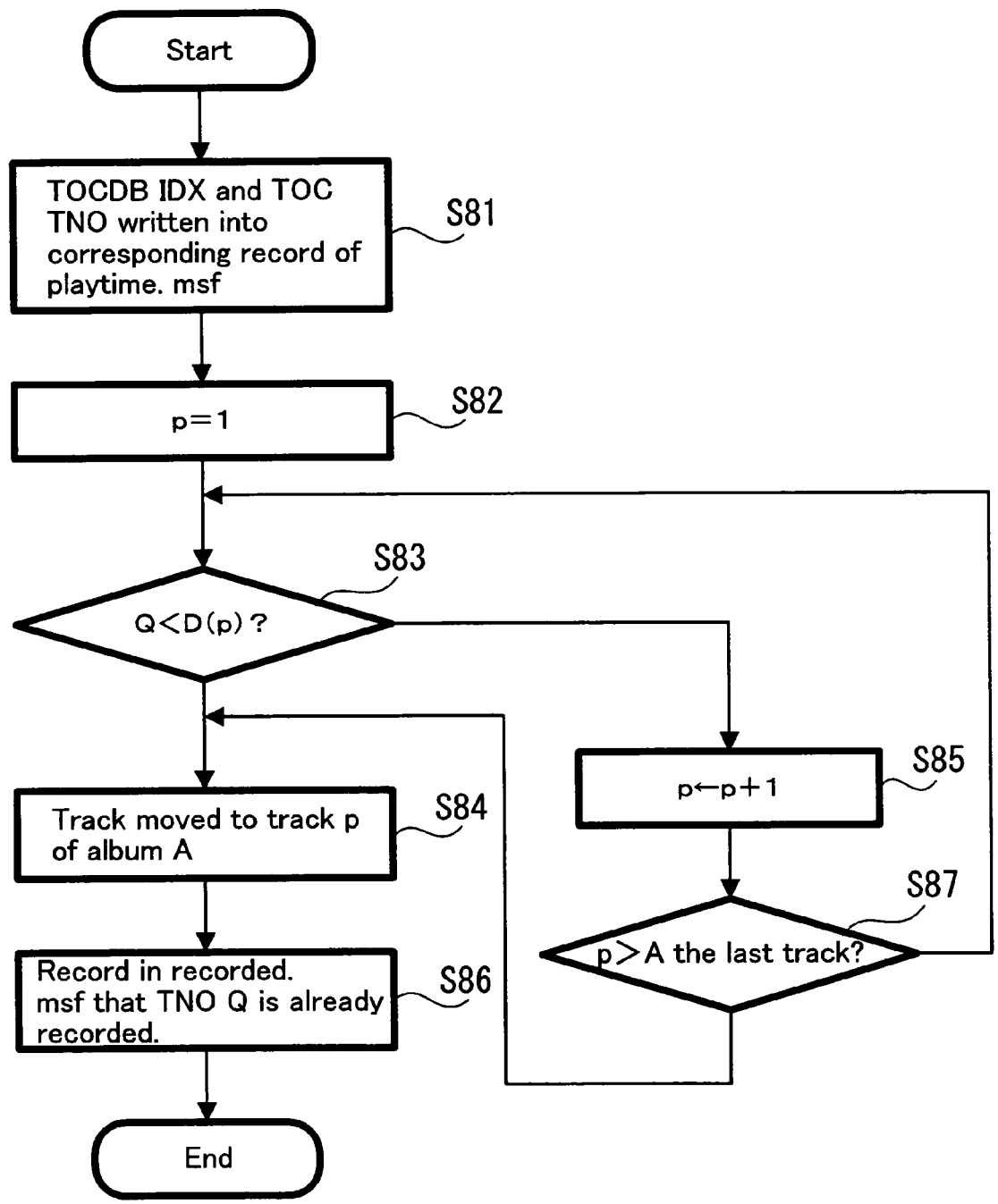
FIG. 37 is a diagram showing processing of track move operation.
Figure 38:
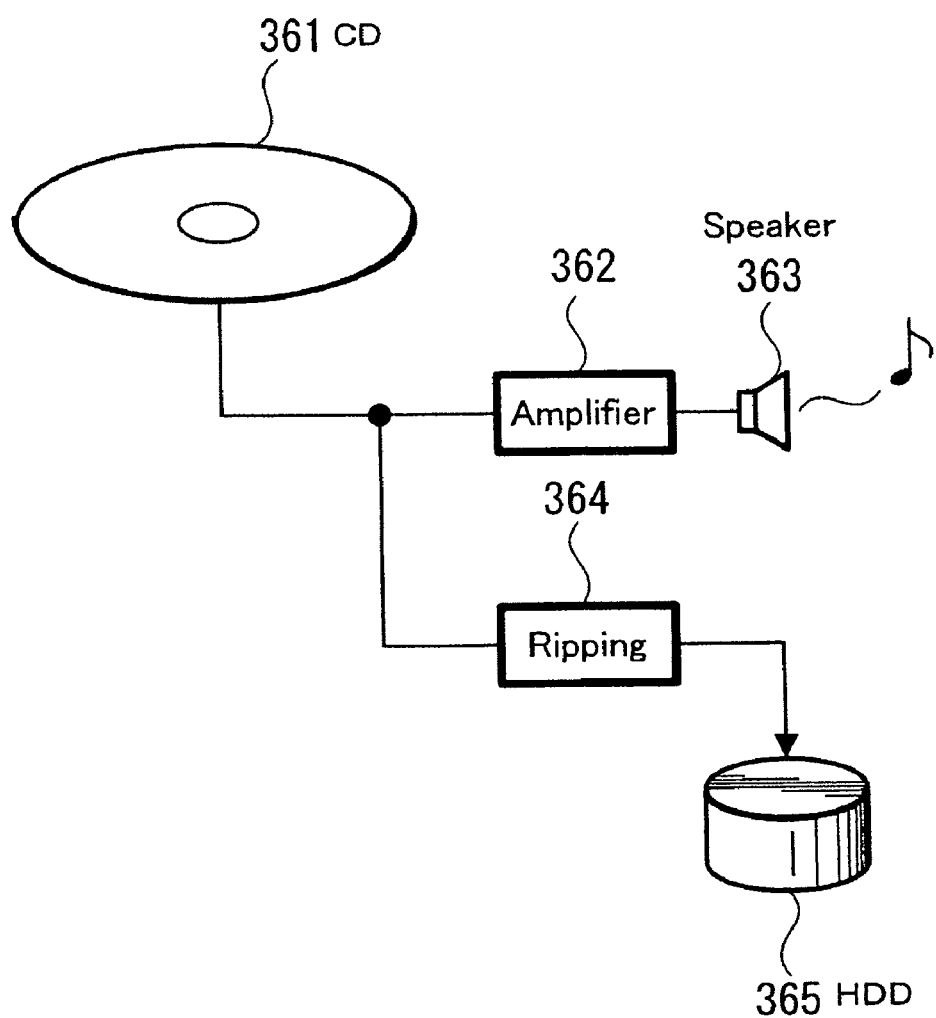
FIG. 38 is a diagram showing a conventional system.

FIG. 37 is a flowchart of explaining the track move described at step S68 in FIG. 36. It is herein assumed for explanation that an album number which is a destination of the track move is A and a variable of counting track in A is p. The $C(n)$ of track desired to be moved is assumed to be Q. Further, $D(p)$ represents TOC TNO indicated by track p in album A.

To begin with, at step S81, the TOC DB INDEX number and TNO of a track desired to be moved are described to renew Playtime. msf. Next, it is assumed that p=1 at step S82. At step S83, it is estimated whether $Q<D(p)$ or not. If $Q>D(p)$, p is incremented by one at step S85. At step S87, the result at step S83 is examined in turn from track 1 of the destination album A until p reaches the last track. Contents of the examination is whether $C(n)$ of the track desired to be moved is larger than TOC TNO, that is, $D(p)$ of the destination track p, or not.

When $Q<D(p)$ at step S83, track is moved to the track p of album A at step S84. What is desired to perform at this step is to arrange tracks in the same order as reproduction order of CD's TOC by moving. For this purpose, track is moved to a place where the relation $C(n)<D(p)$ exists. When the relation $C(n)<D(p)$ does not exist even if the examination is made to the last track of the destination album, a track desired to be moved will be the last track of the destination album.

Finally, at step S86, it is recorded in Recorded. msf that TNO Q is already recorded.

It should be noted that, although an embodiments in which the present invention is applied to audio dubbing from CD to HDD has been described, the present invention is not limited thereto and is also applicable to a case of dubbing AV file, for example. from a recording medium in which video signal is recorded (such as DVD or Blu-ray Disk) to HDD and the like.

According to the embodiment described above, the following advantageous results are obtained.

In addition to the above-described first to sixth advantages, seventhly, because each of the CD reproducing unit and HD recording and reproducing unit do not employ a system to distinguish tracks, it is possible to select only necessary tracks without fail after dividing track after the end of reproduction.

Eighthly, because the size of track which can be recorded in the HD recording and reproducing unit is equal to the reproducing time of each track of the CD reproducing unit, as compared with a unit which changes track based on subcode sent from the CD reproducing unit like a MD recording and reproducing unit, one of conventional recording and reproducing units, it is possible to change track surely and make the size of track equal to that of CD's tracks.

Ninthly, by virtue of the above-described seventh advantage, it is possible to improve the quality and operability of reproduced audio.

Tenthly, because the number of times of divide can be restricted when making use of algorism of track divide, it is possible to reduce a time required for processing.

Additionally, although an embodiment in which audio data is automatically recorded from a CD reproducing unit to a HD recording and reproducing unit has been described for an example, the present invention is not limited thereto and is of course applicable to a case where reproduced data of a plurality of data files which have a definite predetermined reproduction order is automatically recorded from another reproducing unit to another recording and reproducing unit, so long as it falls within the scope of claims of the present invention.

A recording and reproducing apparatus according to the present invention includes: reproducing means for reproducing main data and a first management data for managing the main data that are recorded in a first recording medium; recording and reproducing means for recording in and reproducing from a second recording medium the main data and a second management data for managing the main data to be recorded that are reproduced from the first recording medium; end detection means for detecting an end of each track of the main data that is reproduced by the reproducing means; complete reproducing detection means for detecting that the track has been reproduced completely; management data renewal means for renewing the second management data recorded in the second recording medium, based on detected results from the end detection means and the complete reproducing detection means; and control means for controlling recording the main data reproduced from the first recording medium into the second recording medium based on the second management data and for controlling the management data renewal means so as to renew the second management data when the main data is recorded in the second recording medium. Therefore, because efficient recording can be made by controlling the recording in the second recording medium based on the second management data, it is possible to reduce a waste of time and a storage capacity, whereby such an advantage is obtained that improvements of the reproduction quality and operability can be expected.

Moreover, in the recording and reproducing apparatus according to the present invention described above, because the second management data is renewed based on a reproduction order of tracks recorded in the first management data, such an advantage is obtained that the correspondence to the reproduction order of the original first recording medium can be made in the second recording medium.

Furthermore, the recording and reproducing apparatus according to the present invention further includes a reproduction order changing means for reproducing tracks of main data from the first recording medium in a different reproduction order from that of tracks recorded in the first recording medium, wherein even when the main data recorded in the first recording medium is reproduced in a different reproduction order from that of tracks recorded in the first recording medium by the reproduction order changing means, the second management data is renewed by the management data renewal means based on the reproduction order of tracks recorded in the first management data. Therefore, even though a reproducing file having an arbitrary reproduction order is reproduced as it is, the correspondence to the reproduction order of the original first recording medium can be made, which brings another advantage.

Moreover, in the recording and reproducing apparatus according to the present invention described above, the reproduction order change means decides a reproduction order of the main data from the first recording medium based on an input from an operation means operated by a user. Therefore, even if the reproduction order is changed or erased arbitrarily by a random reproduction or user's input for example, the correspondence to the reproduction order of the original recording medium can be made, which also brings another advantage.

Furthermore, the recording and reproducing apparatus according to the present invention further includes a random number generator means for generating random numbers, wherein the above-described reproduction order change means decides the reproduction order of the main data recorded in the first recording medium based on the random numbers generated by the random number generator means. Therefore, even though the reproduction order is changed or erased arbitrarily based on the random numbers, the correspondence to the reproduction order of the original first recording medium can be made, which brings another advantage.

Moreover, in the recording and reproducing apparatus according to the present invention described above, the control means suppresses the recording of the reproduced main data into the second recording medium, when it is estimated based on the second management data that the already-recorded main data is reproduced from the first recording medium. Therefore, a user will never record a file which he has ever reproduced from the first recording medium into the second recording medium repeatedly, which brings another advantage that a waste of time and a storage capacity can be reduced.

Furthermore, in the above-described recording and reproducing apparatus according to the present invention, the control means controls the management data renewal means so as to renew the second management data based on management data on the main data which is reproduced from the first recording medium and is not yet recorded in the second recording medium. Therefore, another advantage is obtained that a user can manage a new file which he has never reproduced from the first recording medium using the second management data.

Furthermore, the recording and reproducing apparatus according to the present invention further includes a divider means for dividing the main data to be recorded in the second recording medium based on the end detection signal of each track of the main data from the end detection means for recording. Therefore, it is possible to select only necessary track without fail after dividing track after reproduction has finished. Moreover, a size of recorded tracks is equal to a reproducing time of each track in the first recording medium, so that it is possible to change track surely as compared with a conventional apparatus which changes track by means of subcode sent from the first recording medium and to make the size of track equal to that of the first recording medium. Further, because the number of times of divide can be restricted, a time required for processing is saved. This brings another advantage that enables the reproduction quality and operability to be improved.

The recording and reproducing method according to the present invention is used for the recording and reproducing apparatus including: reproducing means for reproducing the main data and the first management data for managing the main data that are recorded in the first recording medium; recording and reproducing means for recording in and reproducing from the second recording medium the main data and the second management data for managing the main data to be recorded that are reproduced from the first recording medium; and control means for making various controls, in which the main data is recorded or reproduced based on the second management data. The method includes an end detection step of detecting an end of each track of the main data reproduced by the reproducing means; a complete reproducing detection step of detecting that track has been reproduced completely; a management data renewal step of renewing the second management data to be recorded in the second recording medium based on detected results in the end detection step and complete reproducing detection step; and a control step of controlling recording the main data reproduced from the first recording medium into the second recording medium based on the second management data and controlling the management data renewal step by the control means so as to renew the second management data when the main data has been recorded in the second recording medium. Therefore, by controlling the recording into the second recording medium based on the second management data, efficient recording can be made and so a waste of time and a storage capacity can be reduced. This brings an advantageous result that improvements of the reproduction quality and operability can be expected.

Moreover, in the above-described recording and reproducing method according to the present invention, the second management data is renewed based on reproduction order of tracks recorded in the first recording medium, so that an advantage is obtained that the correspondence to original reproduction order of the first recording medium can be made in the second recording medium.

The recording and reproducing method according to the present invention further includes a reproduction order changing step of reproducing tracks of the main data from the first recording medium in reproduction order different from that of tracks recorded in the first management data. Even when the main data recorded in the first recording medium is reproduced, in the reproducing changing step, in different reproduction order from that of tracks recorded in the first management data, the second management data is renewed in the management data renewal step based on reproduction order of tracks recorded in the first management data. Thus, even if a reproducing file having arbitrary reproduction order is reproduced as it is, the correspondence to original reproduction order of the first recording medium can be made, which brings another advantage.

Furthermore, in the above-described reproduction order changing step of the recording and reproducing method according to the present invention, reproduction order of the main data from the first recording medium is decided based on an input from an operation means operated by a user. Therefore, even though the reproduction order is changed or erased arbitrarily by a random reproduction or user's input for example, the correspondence to the original reproduction order of the first recording medium can be made, which brings another advantage.

Moreover, the recording and reproducing method according to the present invention further includes the random number generating step in which the random numbers are generated, wherein the reproduction order of the main data recorded in the first recording medium is decided, in the reproduction order changing step, based on random numbers generated in the random number generating step. Therefore, even though the reproduction order is changed or erased arbitrarily based on the random numbers, the correspondence to the reproduction order of the original first recording medium can be made, which brings another advantage.

Furthermore, in the recording and reproducing method according to the present invention, when it is estimated in the control step that the already-recorded main data is reproduced from the first recording medium based on the second management data, recording of the reproduced main data into the second recording medium is suppressed. Therefore, a user will never record repeatedly a file which he has ever reproduced from the first recording medium. This brings another advantage that a waste of time and a storage capacity can be reduced.

Moreover, in the recording and reproducing method according to the present invention, when it is estimated in the control step that the main data not yet recorded in the second recording medium is reproduced from the first recording medium, the management data renewal step is controlled so as to renew the second management data based on the management data on the main data which is reproduced from the first recording medium and is not yet recorded in the second recording medium. Therefore, another advantage is obtained that a user can manage with the second data a new file which he has never reproduced from the first recording medium.

Furthermore, the recording and reproducing method according to the present invention includes the dividing step in which the main data to be recorded in the second recording medium is divided for recording based on the end detection signal of each track of the main data from the end detection step. Therefore, it is possible to select only necessary track without fail after dividing track after the end of reproduction.

Moreover, because the size of track to be recorded is equal to the reproducing time of each track of the first recording medium, as compared with a conventional apparatus which changes track by the subcode sent from the first recording medium, it is possible to change track surely and make the size of track equal to that of the first recording medium. Further, because the number of times of divide can be restricted, with reducing a time required for processing, an advantage is obtained that the reproduction quality and operability can be improved.

INDUSTRIAL APPLICABILITY

The present invention can be applied to a recording and reproducing system for simultaneously recording audio data reproduced from CD in HDD to be reproduced.

DESCRIPTION OF REFERENCE NUMERALS

1 . . . CD
2 . . . REPRODUCING MEANS
3 . . . COMPLETE REPRODUCING DETECTION MEANS
4 . . . END DETECTION MEANS
5 . . . GENERATING MEANS
6 . . . MOVE LIST
7 . . . RECORDING AND REPRODUCING MEANS
8 . . . RENEWAL MEANS
9 . . . HDD
10 . . . DIVIDER MEANS
11 . . . PELIST
12 . . . AUDIO DATA
21 to 24 . . . 001 to CD 004
25 . . . REPRODUCTION ORDER OF AUDIO DATA FILE
26 . . . MANAGEMENT DATA
27 . . . MANAGEMENT FILE
28 . . . AUDIO DATA
29 . . . AUDIO FILE
30 . . . MANAGEMENT NUMBER
31 . . . CD'S AUDIO DATA FILE NUMBER
32 . . . REPRODUCTION RESULTS COMPLETE/INCOMPLETE
33 . . . AUDIO FILE ON HDD
34 . . . ORIGINAL AUDIO DATA FILE NUMBER OF CD
35 . . . MOVE LIST
41 . . . SYSTEM CONTROLLER
42 . . . CD REPRODUCING UNIT
43 . . . HD RECORDING AND REPRODUCING UNIT
44 . . . AUDIO INPUT/OUTPUT SECTION
45 . . . EXTERNAL CONTROL TERMINAL
51 . . . CD
52 . . . SPINDLE MOTOR
53 . . . OPTICAL HEAD
54 . . . SLED MECHANISM
55 . . . SERVO CIRCUIT
56 . . . RE AMPLIFIER
57 . . . DECODER
58 . . . CD CONTROLLER
61 . . . ONE FRAME
62 . . . SYNCHRONIZING PATTERN
63 . . . SUBCODING
64 . . . DATA AND PARITY
65 . . . SUBCODE DATA PQRSTUVW
71 . . . SUBCODE Q DATA
72 . . . CONTROL
73 . . . ADDRESS
74 . . . DATA
75 . . . RC

81 ... DIGITAL INTERFACE
82 ... ANALOG INTERFACE
83 ... COMPRESS/EXPAND
84 ... ENCODER/DECODER
85 ... COMMON RAM
86 ... HD CONTROLLER
87 ... SDRAM
88 ... FILR SYSTEM
89 ... HDD
91 ... ROOT DIRECTORY
92 ... DIRECTORY HiFi
93-1 ... Pblist. msf (ALBUM NUMBER MANAGEMENT FILE)
93-2 ... Playtime. msf (REPRODUCTION TIME MANAGEMENT DATABASE)
93-3 ... Namedb. msf (ALBUM/TRACK NAME DATABASE)
93-4 ... Tocdb. msf (CD TOC DATABASE)
93-5 ... Recorded. inst (DATABASE OF RECORDED AUDIO DATA FILE)
936 ... Album000
93-6-1 ... Pb000001. msf (ALBUM 1 MANAGEMENT FILE)
93-6-2 ... Pb000002. msf (ALBUM 2 MANAGEMENT FILE)
93-6-500 ... Pb0001f4. msf (ALBUM 500 MANAGEMENT FILE)
94-1 ... Album001
94-1-1 ... A3d00001. msa (AUDIO FILE)
94-2 ... Album002
94-100 ... Album100
95 ... Playlist
95-1 ... Pb0001f5. msf (PLAYLIST 1 MANAGEMENT FILE)
95-2 ... Pb0001f6. msf (PLAYLIST 2 MANAGEMENT FILE)
95-10 ... Pb0001fe. msf (PLAYLIST 10 MANAGEMENT FILE)
96 ... Temp
96-1 ... Pb0001ff. msf (AUTOMATIC RECORDING MANAGEMENT FILE)

The invention claimed is:

1. A recording and reproducing apparatus comprising:
reproducing means for reproducing main data and first management data for managing said main data that are recorded in a first recording medium,
a reproduction order changing means for changing a reproduction order of tracks of the main data reproduced from the first recording medium to be different than a reproduction order of tracks recorded as said first management data,
recording and reproducing means for recording in and reproducing from a second recording medium the main data reproduced from said first recording medium and second management data for managing said main data to be recorded in said second record medium,
end detection means for detecting an end of each track of the main data reproduced by said reproducing means,
complete reproducing detection means for detecting that each track has been reproduced completely,
management data renewal means for renewing the second management data to be recorded in said second recording medium based on detection results from said end detection means and said complete reproducing detection means, whereby even though the main data recorded in said first recording medium is reproduced in the reproduction order different than the reproduction order of tracks recorded as said first management data by said reproduction order changing means, said second management data is renewed by said management data renewal means based on the reproduction order of tracks recorded as said first management data, and
control means for controlling recording of the main data reproduced from said first recording medium into said second recording medium based on said second management data and for controlling said management data renewal means so as to renew said second management data when said main data recorded in said second recording medium.

2. The recording and reproducing apparatus according to claim 1, wherein
said reproduction order changing means decides the reproduction order of the main data from said first recording medium based on an input from operation means operated by a user.

3. A recording and reproducing apparatus according to claim 1, further comprising
random number generator means for generating random numbers, wherein said reproduction order changing means decides the reproduction order of the main data recorded in said first recording medium based on random numbers generated by said random number generator means.

4. A recording and reproducing apparatus according to claim 1, wherein
when it is estimated based on said second management data that main data which has already been recorded in said second recording medium is being reproduced from said first recording medium, recording of said main data being reproduced into said second recording medium is restricted.

5. The recording and reproducing apparatus according to claim 1, wherein
when it is estimated that main data reproduced from said first recording medium is not yet recorded in said second recording medium, said control means controls said management data renewal means so as to renew said second management data based on management data that is reproduced from said first recording medium.

6. A recording and reproducing apparatus according to claim 1, further comprising
divider means for dividing the main data recorded in the second recording medium based on an end detection signal of each track of the main data from said end detection means for recording.

7. A recording and reproducing method for a recording and reproducing apparatus including reproducing means for reproducing main data and first management data for managing said main data that are recorded in a first recording medium, for recording in a second recording medium and reproducing from the second recording medium the main data reproduced from said first recording medium and second management data for managing said main data to be recorded in said second recording medium, and control means for controlling recording or reproduction of said main data based on said second management data, the recording and reproducing method comprising the steps of:
changing a reproduction order of tracks of the main data reproduced from said first recording medium to be different from then a reproduction order of tracks as said first management data,
detecting an end of each track of the main data reproduced by said reproducing means,
detecting that each track has been reproduced completely, renewing the second management data, to be recorded in said second recording medium based on detected results of said end detecting step and said complete reproducing detecting step, wherein even though the main data recorded in said first recording medium is reproduced in the reproduction order different than that of tracks recorded in said first recording medium, said second management data is renewed based on the reproduction order of tracks recorded as said first management data, and controlling recording the main data reproduced from said first recording medium in said second recording medium based on said second management data, and controlling said management data when said main data is recorded in said second recording medium.

8. The recording and reproducing method according to claim 7, wherein
the reproduction order of the main data from said first recording medium is determined based on an input from operation means operated by a user in said reproduction order changing step.

9. The recording and reproducing method according to claim 7, further comprising
a random number of generating step of generating random numbers, wherein the reproduction order of the main data recorded in said first recording medium is determined in said reproduction order changing step based on the random numbers generated in said random number generating step.

10. The recording and reproducing method according to claim 7, wherein
when it is estimated based on said second management data that main data which has already been recorded in said second recording medium is being reproduced from said first recording medium, recording said main data in said second recording medium is restrained in said step of controlling recording.

11. The recording and reproducing method according to claim 7, wherein
when it is estimated in said control step that main data reproduced from said first recording medium is not yet recorded in said second recording medium, said management data renewal step is controlled so as to renew said second management data based on management data that is reproduced from said first recording medium.

12. The recording and reproducing method according to claim 7, further comprising
a dividing step of dividing the main data to be recorded the second recording medium based on an end detection signal of each track of the main data from said end detecting step.

13. A recording and reproducing apparatus comprising:
a reproducing unit for reproducing main data and first management data for managing said main data that are recorded in a first recording medium,
a reproduction order changing unit for changing a reproduction order of tracks of the main data reproduced from the first recording medium to be different than a reproduction order of tracks recorded as said first management data,
a recording and reproducing unit for recording in and reproducing from a second recording medium the main data reproduced from said first recording medium and second management data for managing said main data to be recorded in said second record medium,
an end detection unit for detecting an end of each track of the main data reproduced by said reproducing unit,
a complete reproducing detection unit for detecting that each track has been reproduced completely,
a management data renewal unit for renewing the second management data to be recorded in said second recording medium based on detection results from said end detection unit and said complete reproducing detection unit, whereby even though the main data recorded in said first recording medium is reproduced in the reproduction order different than the reproduction order of tracks recorded as said first management data by said reproduction order changing unit, said second management data is renewed by said management data renewal unit, based on the reproduction order of tracks recorded as said first management data, and
a controller for controlling recording of the main data reproduced from said first recording medium into said second recording medium based on said second management data and for controlling said management data renewal unit so as to renew said second management data when said main data recorded in said second recording medium.

14. The recording and reproducing apparatus according to claim 13, wherein
said reproduction order changing unit decides the reproduction order of the main data from said first recording medium based on an input from an operation unit operated by a user.

15. The recording and reproducing apparatus according to claim 13, further comprising:
a random number generator unit for generating random numbers, wherein said reproduction order changing unit decides the reproduction order of the main data recorded in said first recording medium based on random numbers generated by said random number generator unit.

16. The recording and reproducing apparatus according to claim 13, wherein
when it is estimated based on said second management data that main data which has already been recorded in said second recording medium is being reproduced from said first recording medium, recording of said main data being reproduced into said second recording medium is restricted.

17. The recording and reproducing apparatus according to claim 13, wherein
when it is estimated that main data reproduced from said first recording medium is not yet recorded in said second recording medium, said controller controls said management data renewal unit so as to renew said second management data based on management data that is reproduced from said first recording medium.

18. The recording and reproducing apparatus according to claim 13, further comprising
a divider unit f or dividing the main data recorded in the second recording medium based on an end detection signal of each track of the main data from said end detection unit for recording.

* * * * *